United States Patent
Hara et al.

(10) Patent No.: US 12,131,076 B2
(45) Date of Patent: Oct. 29, 2024

(54) SYSTEM AND METHOD FOR ACQUIRING AND PRINTING CONTENT IN A VIRTUAL SPACE

(71) Applicant: CANON KABUSHIKI KAISHA, Tokyo (JP)

(72) Inventors: Yosuke Hara, Tokyo (JP); Masashi Ohno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/499,854

(22) Filed: Nov. 1, 2023

(65) Prior Publication Data
US 2024/0143243 A1 May 2, 2024

(30) Foreign Application Priority Data
Nov. 2, 2022 (JP) .................. 2022-176741

(51) Int. Cl.
*G06F 3/12* (2006.01)
*G06F 3/01* (2006.01)

(52) U.S. Cl.
CPC ............ *G06F 3/1204* (2013.01); *G06F 3/011* (2013.01); *G06F 3/1257* (2013.01); *G06F 3/1237* (2013.01); *G06F 3/1287* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 10,576,366 B2 * | 3/2020 | Mizuki | A63F 13/5375 |
| 2015/0339561 A1 * | 11/2015 | Takenaka | G06F 3/1238 |
| | | | 358/1.14 |
| 2016/0221363 A1 * | 8/2016 | Bae | B41J 3/4075 |
| 2020/0066042 A1 * | 2/2020 | Marsh | G06T 19/006 |
| 2020/0120231 A1 * | 4/2020 | Kanoh | H04N 1/00214 |
| 2021/0090329 A1 * | 3/2021 | Ohashi | G06F 3/0304 |

FOREIGN PATENT DOCUMENTS

JP 2021061002 A 4/2021

* cited by examiner

*Primary Examiner* — Haris Sabah
(74) *Attorney, Agent, or Firm* — Canon U.S.A., Inc. IP Division

(57) ABSTRACT

A content management system manages content identification information of content data corresponding to a content provided through a virtual space and user identification information of a user in association with each other, in response to the user's instruction using a terminal for projecting an expression related to the virtual space into the user's field of view in order to provide the virtual space to the user, receives a request using the user identification information, transmits the content data corresponding to the content identification information, which is managed in association with the user identification information included in the request, to a request source of the request, and transmits a printing request for the content data to the printing system. The printing system controls printing of the content data based on the printing request.

5 Claims, 28 Drawing Sheets

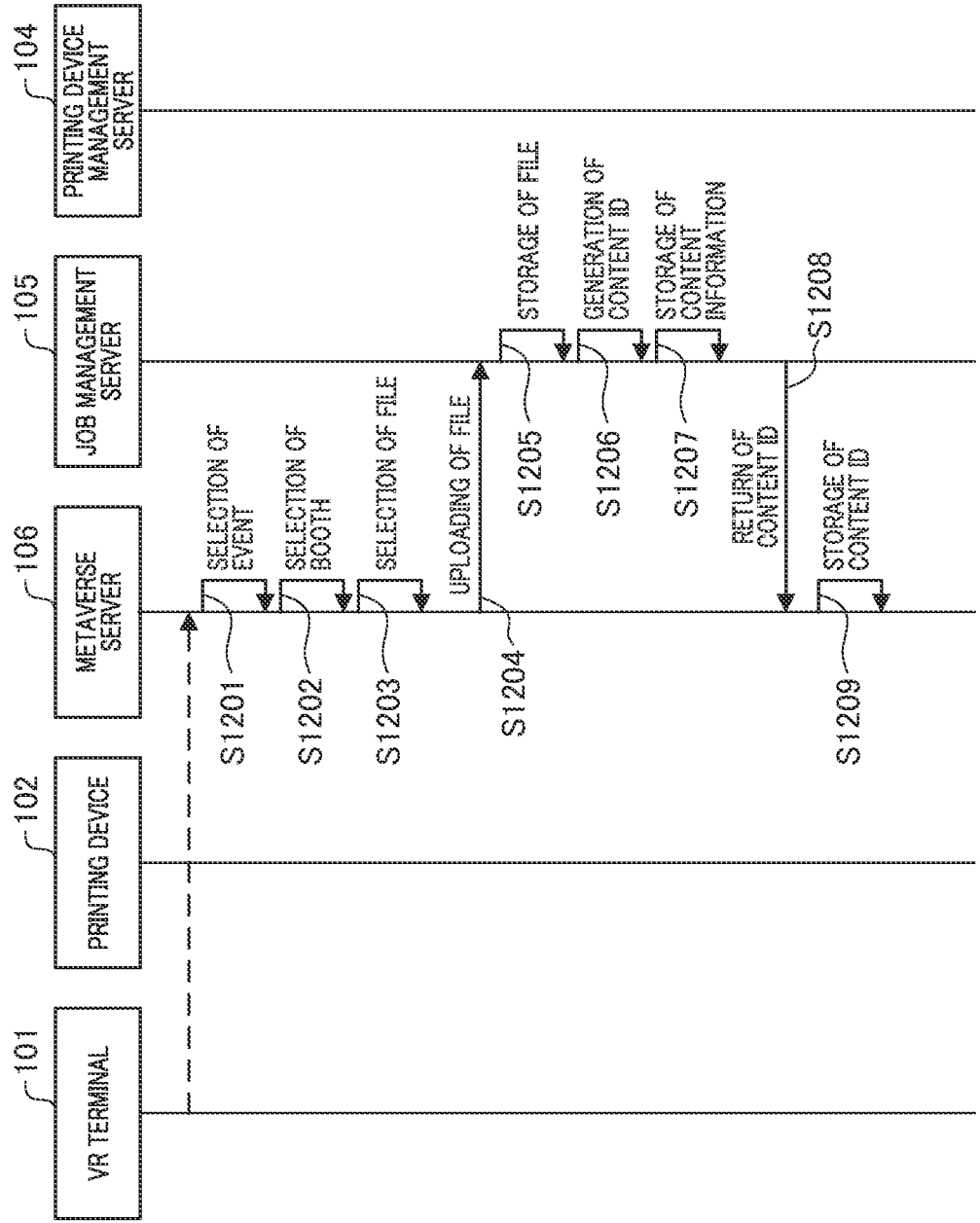

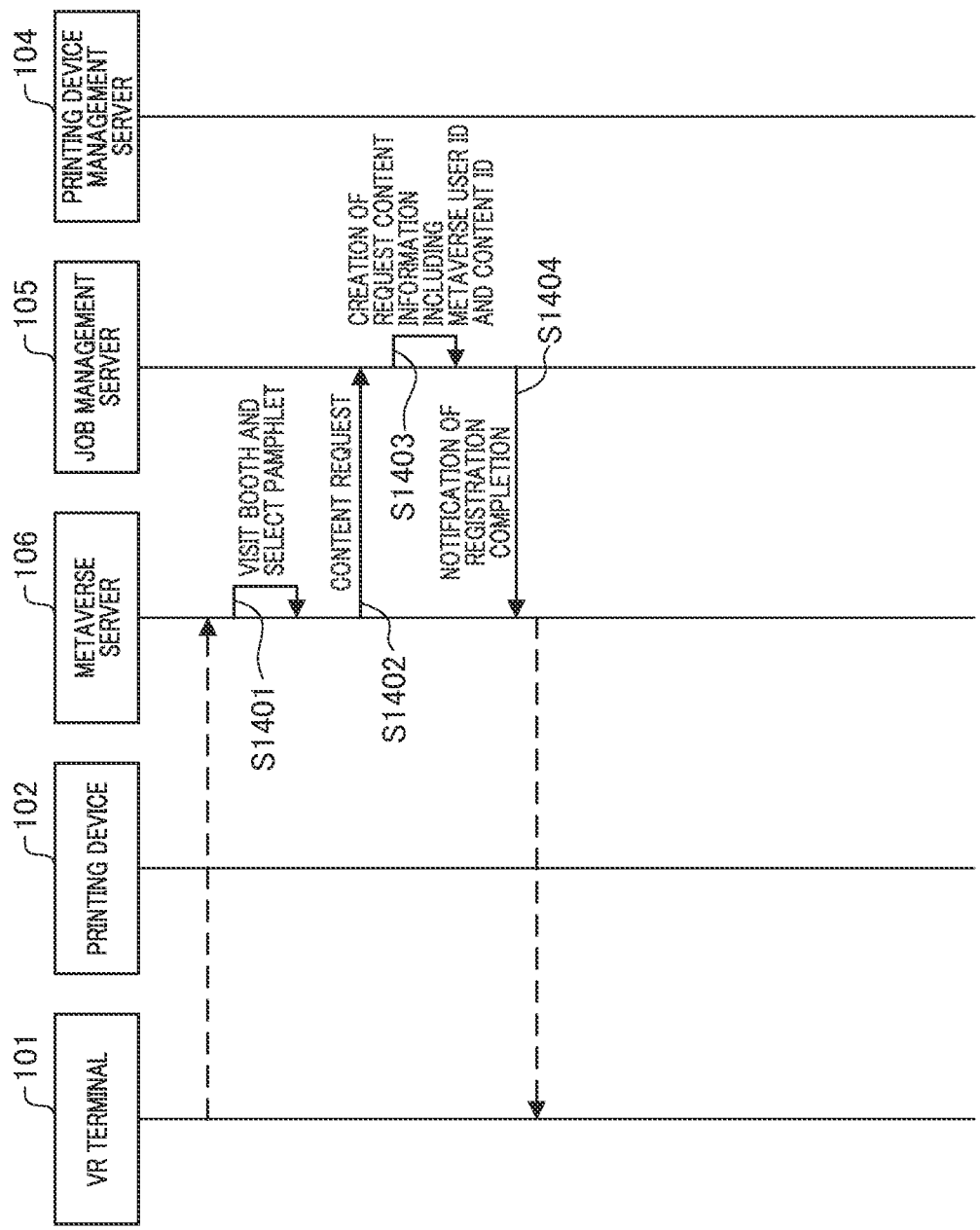

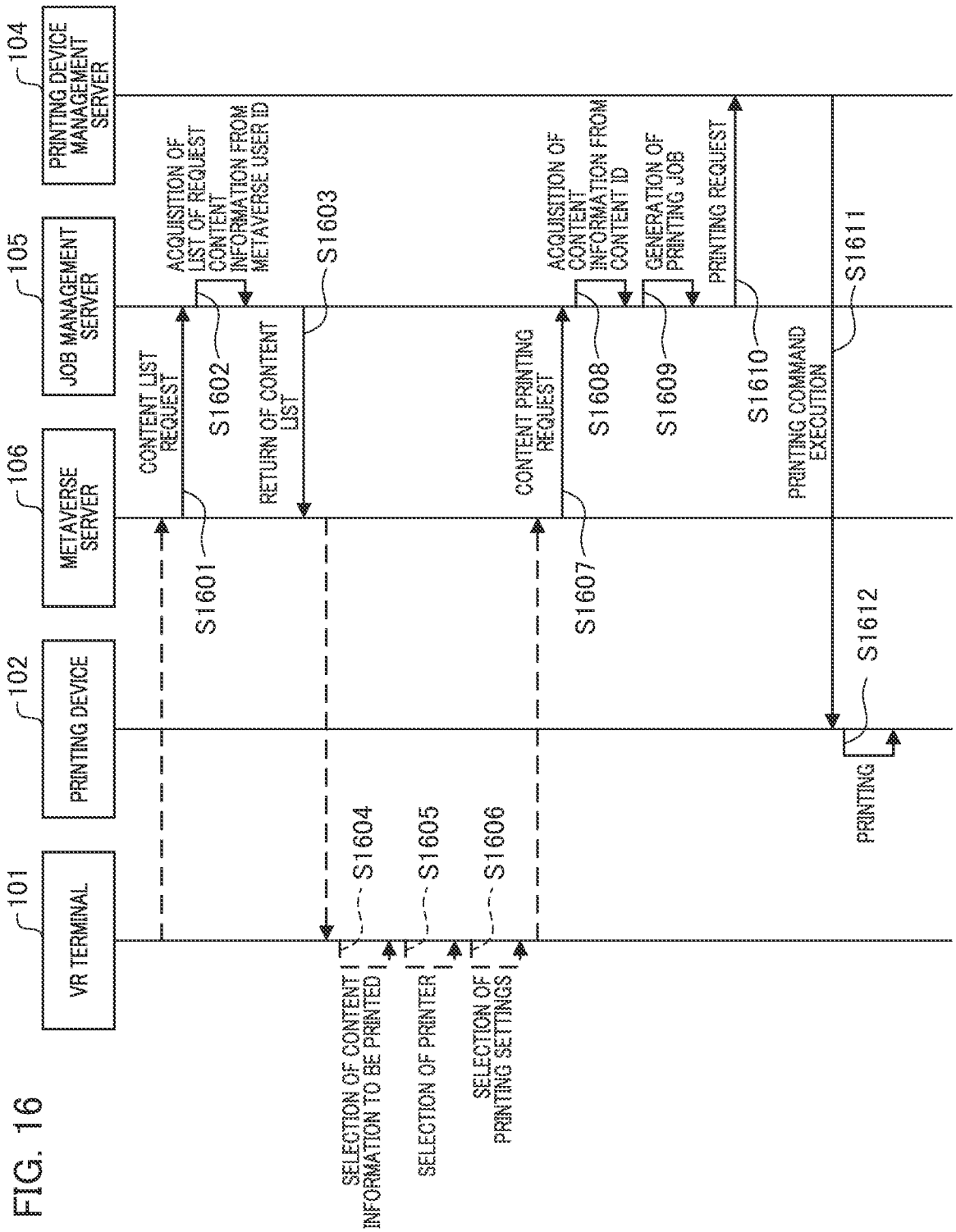

FIG. 23

| Content ID | File name | Event-related information |
|---|---|---|
| C000001 | xxxx.pdf | Event-related information |
| C000002 | aaaa.pdf | Event-related information |
| C000003 | bbbb.pdf | Event-related information |

FIG. 24

| Metaverse user ID | Content ID | File name | Event-related information |
|---|---|---|---|
| MU00001 | C000001 | xxxx.pdf | Event-related information |
| MU00002 | C000002 | aaaa.pdf | Event-related information |
| MU00003 | C000003 | bbbb.pdf | Event-related information |

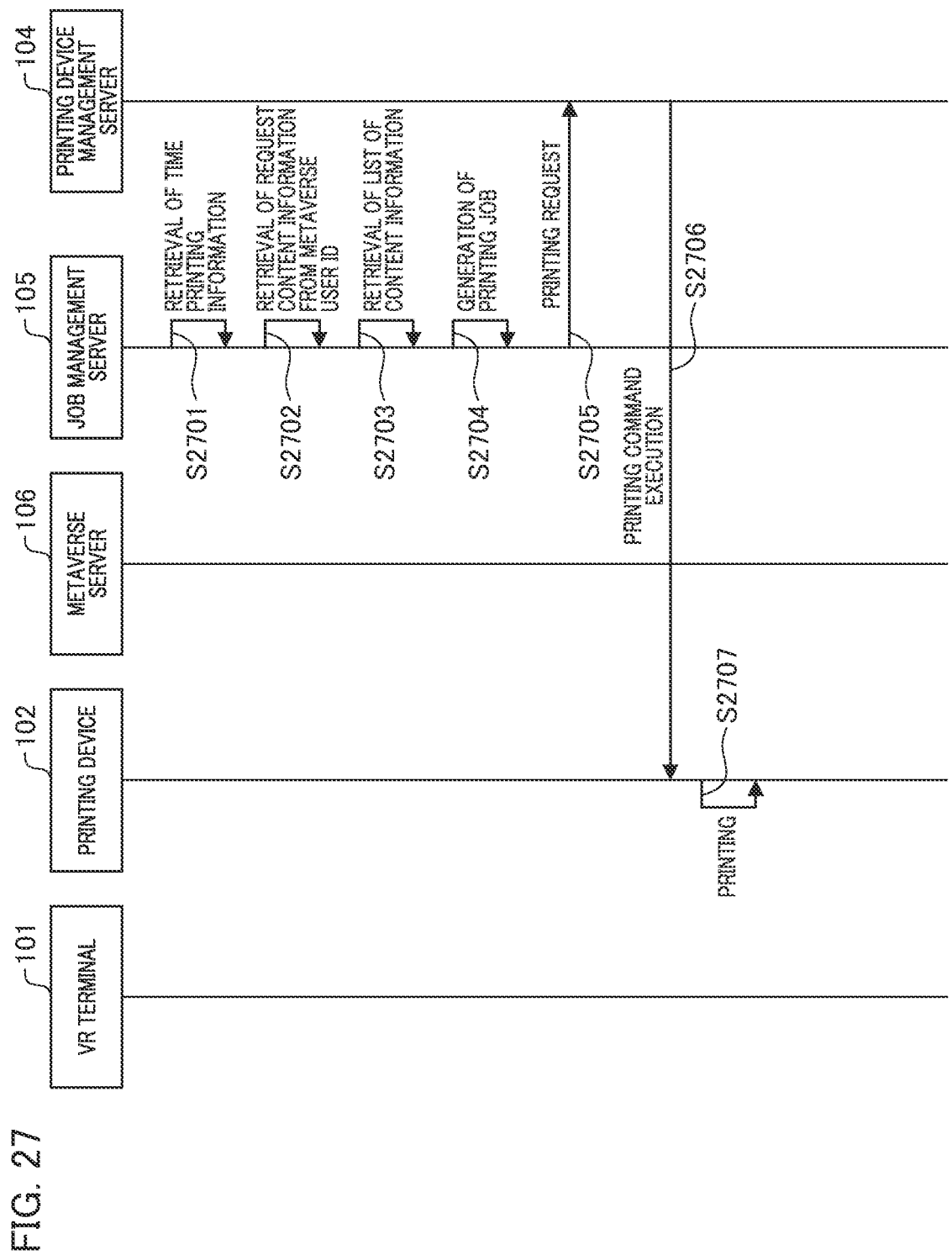

FIG. 28

| Metaverse user ID | Printing device ID | Printing time | Printing setting information |
|---|---|---|---|
| MU00001 | C000001 | June 27, 2022 14:52 | Printing setting information |
| MU00002 | C000002 | June 29, 2022 14:00 | Printing setting information |
| MU00003 | C000003 | June 30, 2022 17:30 | Printing setting information |

SYSTEM AND METHOD FOR ACQUIRING AND PRINTING CONTENT IN A VIRTUAL SPACE

BACKGROUND

Field of the Disclosure

The present disclosure relates to a system relating to the Metaverse and a method.

Description of the Related Art

In the related art, there has been a rapid spread of remote working, telecommuting, and the like in which work is performed by connecting to a company's intranet environment from home without going to work and in-house materials are handled on a PC at home. In such an environment, vendors are starting to pay attention to the development of workspaces in the Metaverse, which is an example of a virtual space.

In recent years, users have been able to obtain a sense of immersion that cannot be compared with before due to an improvement in the technical capabilities of the VR terminals themselves. VR is an abbreviation for Virtual Reality. For example, VR terminals have made it possible to obtain more comfortable spaces for participating in meetings using avatars and concentrating on work. In the future, it is expected that the number of business users using VR terminals, workspaces in the Metaverse, or the like will increase. As a result, it is expected that there will be a growing need to print products in the Metaverse in a physical space.

Japanese Patent Application Laid-Open No. 2021-61002 discloses a system that enables an image forming apparatus to print data by attaching data to a message posted to a messaging service.

However, Japanese Patent Application Laid-Open No. 2021-61002 does not disclose acquisition and printing of a content in the Metaverse.

As described above, when there are more opportunities to use the Metaverse for business, it is also expected that an event, such as a business forum, will be held by using a sense of immersion, which is a characteristic of the Metaverse, and avatars. There is a possibility that a content will be distributed in the scene of such an event. For example, when there are a plurality of booth pamphlets desired to be printed at an event in the Metaverse, giving a printing instruction every time a pamphlet is acquired results in time and effort each time such as setting of printing settings each time or the necessity of selecting a printing device.

In addition, means for distributing a content such as pamphlets may be different for each booth. For example, in the case of e-mail distribution at a booth A and cloud storage distribution at a booth B, it takes time and effort to acquire a content, and a plurality of methods have to be attempted, which results in time and effort.

SUMMARY

In this manner, there has been an improvement in acquiring and printing content in a virtual space in the related art.

Some embodiments of the present disclosure provide an improved system for acquiring and printing content in a virtual space.

A system according to one embodiment of the present disclosure is a system comprising: a printing system and a content management system, wherein the content management system includes a memory storing instructions, and a processor executing the instructions causing the content management system to manage content identification information of content data corresponding to a content provided through a virtual space and user identification information of a user in association with each other, in response to the user's instruction using a terminal for projecting an expression related to the virtual space into the user's field of view in order to provide the virtual space to the user, receive a request using the user identification information, transmit the content data corresponding to the content identification information, which is managed in association with the user identification information included in the request, to a request source of the request, and transmit a printing request for the content data to the printing system, and wherein the printing system includes a memory storing instructions, and a processor executing the instructions causing the printing system to control printing of the content data based on the printing request.

Further features of various embodiments of the present disclosure will become apparent from the following description of exemplary embodiments (with reference to the attached drawings).

BRIEF DESCRIPTION OF THE DRAWINGS

FIG. 12 is a sequence diagram illustrating content registration processing in the system according to the first embodiment of the present disclosure.

FIG. 14 is a sequence diagram illustrating content acquisition request registration in the system according to the first embodiment of the present disclosure.

FIG. 16 is a sequence diagram illustrating content printing processing instructed from the VR terminal in the system according to the first embodiment of the present disclosure.

FIG. 23 is a diagram illustrating an example of a data structure of a content information DB 904 in the job management server 105 according to the first embodiment of the present disclosure.

FIG. 24 is a diagram illustrating an example of a data structure of a request content information DB 905 in the job management server 105 according to the first embodiment of the present disclosure.

FIG. 27 is a sequence diagram illustrating time printing execution processing in the system according to the second embodiment of the present disclosure.

FIG. 28 is a diagram illustrating an example of a data structure of a time printing information DB in a job management server 105 according to the second embodiment of the present disclosure.

DESCRIPTION OF THE EMBODIMENTS

Embodiments of the present disclosure will be described below with reference to the drawings. The following embodiments do not limit every embodiment according to the claims, and not all combinations of features described in the embodiments are essential to the solution of every embodiment.

First Embodiment

<System configuration in Metaverse>

Figure 1:
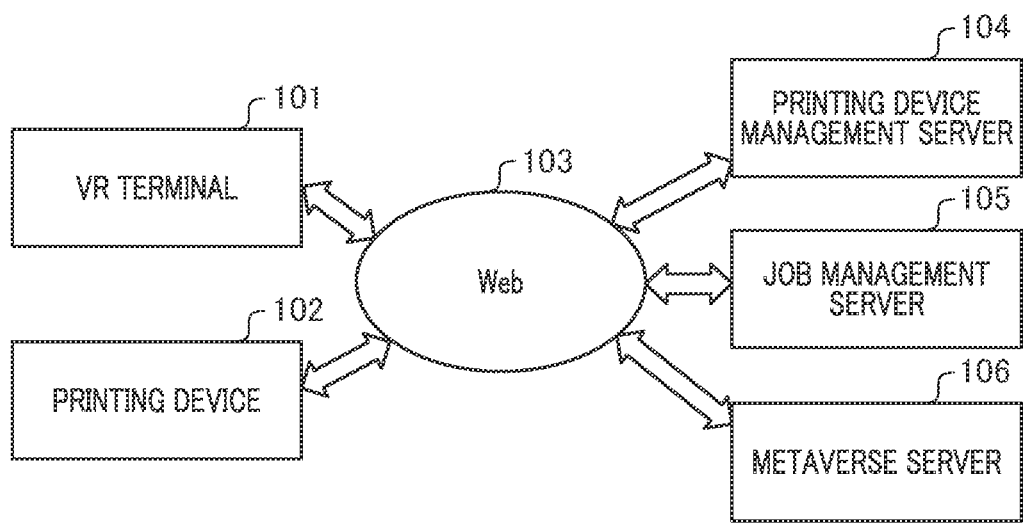
FIG. 1 is a block diagram illustrating an example of a configuration of a system in the Metaverse according to a first embodiment of the present disclosure.

FIG. 1 is a block diagram illustrating an example of a system configuration in the Metaverse according to a first embodiment of the present disclosure. As illustrated in FIG. 1, the system according to this embodiment includes a VR terminal 101, a printing device 102, a Web 103, a printing device management server 104, a job management server 105, and a Metaverse server 106. Metaverse is an example of a virtual space. The VR terminal 101 is an example of a terminal for projecting an expression related to the virtual space into a field of view of a user in order to provide the virtual space to the user. The printing device 102 and the printing device management server 104 are examples of a printing system that sets and executes printing in a virtual space. The job management server 105 and the Metaverse server 106 are examples of a content management system that manages a content in a virtual space.

The VR terminal 101, the printing device 102, the printing device management server 104, the job management server 105, and the Metaverse server 106 are connected to the Web 103. The Web 103 is the Internet. Web is an abbreviation for World Wide Web. The VR terminal 101, the printing device 102, the printing device management server 104, the job management server 105, and the Metaverse server 106 communicate with each other via the Web 103 and can transmit and receive information to and from each other. Communication via the Web 103 is executed using protocols such as HTTP and XMPP. HTTP is an abbreviation for Hypertext Transfer Protocol. XMPP is an abbreviation for Extensible Messaging and Presence Protocol. Communication via the Web 103 may use other protocols.

The VR terminal 101 is, for example, a head mounted display. The VR terminal 101 is a device including hardware and software corresponding to rendering of virtual objects in the Metaverse.

<Hardware Configuration of VR Terminal>

Figure 2:
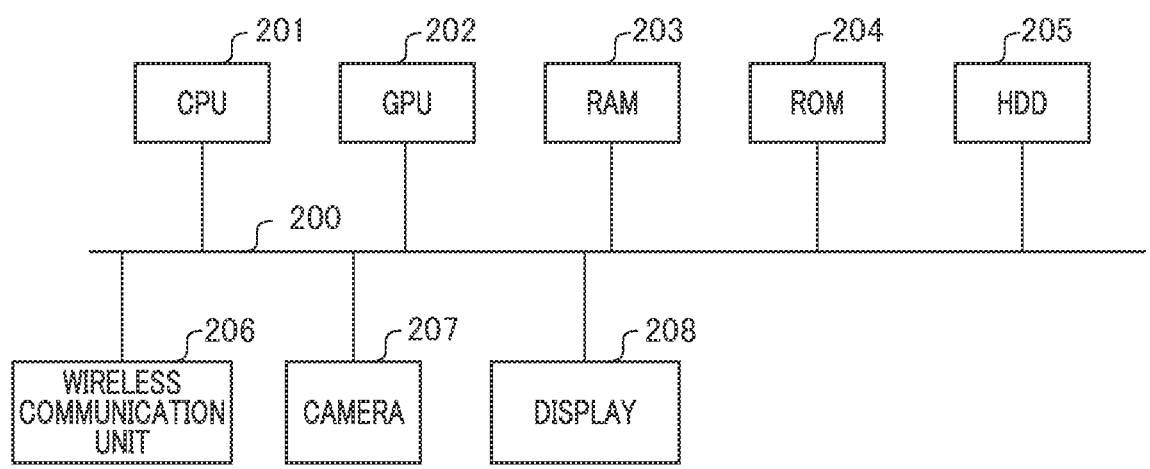
FIG. 2 is a block diagram illustrating an example of a hardware configuration of a VR terminal 101 illustrated in FIG. 1.

FIG. 2 is a block diagram illustrating an example of a hardware configuration of the VR terminal 101 illustrated in FIG. 1. The VR terminal 101 includes a CPU 201, a GPU 202, a RAM 203, a ROM 204, an HDD 205, a wireless communication unit 206, a camera 207, and a display 208.

The CPU 201 controls the entire device. The CPU 201 executes application programs, an OS, and the like stored in the HDD 205 and performs control of temporarily storing information, files, and the like necessary for executing the programs in the RAM 203. CPU is an abbreviation for Central Processing Unit. HDD is an abbreviation for Hard Disk Drive. OS is an abbreviation for Operating System. RAM is an abbreviation for Random Access Memory.

The GPU 202 performs arithmetic processing necessary for drawing virtual objects in the Metaverse in real time. GPU is an abbreviation for Graphics Processing Unit.

The RAM 203 is temporary storage means, and functions as a main memory, a work area, and the like for the CPU 201 and the GPU 202.

The ROM 204 is storage means, and stores various data such as basic I/O programs therein. ROM is an abbreviation for Read Only Memory.

The HDD 205 is one of external storage means, functions as a large-capacity memory, and stores application programs such as web browsers, programs of a service server group, an OS, related programs, and the like.

The wireless communication unit 206 is connected to a network such as the Internet and performs a variety of communication. The camera 207 captures a video of the surroundings of the VR terminal 101. The display 208 is display means, and displays virtual objects in the Metaverse, information necessary for operations, and the like.

<Software Configuration of VR Terminal>

Figure 3:
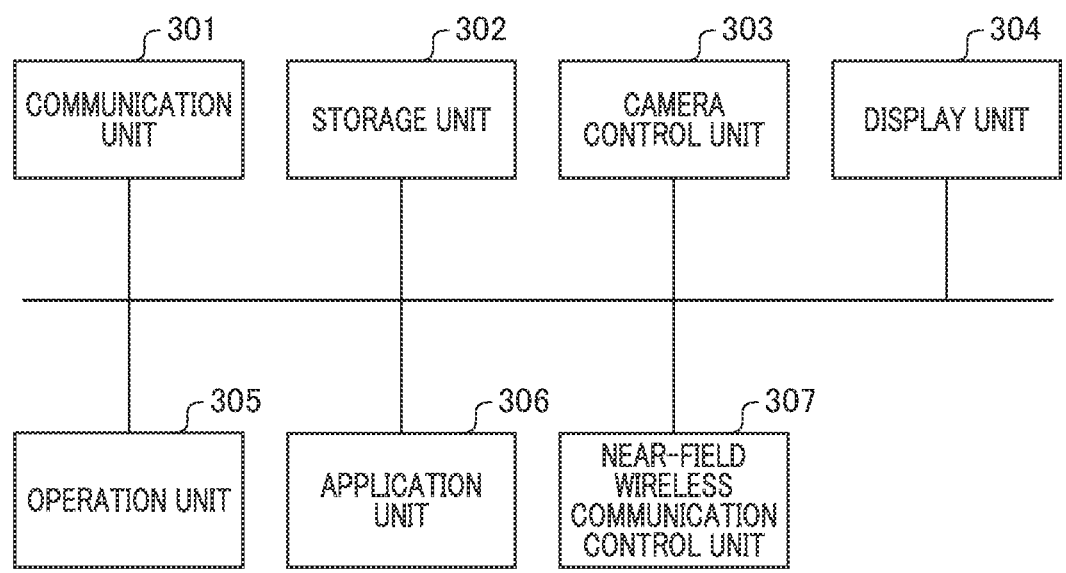
FIG. 3 is a block diagram illustrating an example of a software configuration of the VR terminal 101 illustrated in FIG. 1.

FIG. 3 is a block diagram illustrating an example of a software configuration of the VR terminal 101 illustrated in FIG. 1. The VR terminal 101 includes a communication unit 301, a storage unit 302, a camera control unit 303, a display unit 304, an operation unit 305, an application unit 306, and a near-field wireless communication control unit 307. Each configuration illustrated in FIG. 3 is implemented by causing the CPU 201 or the GPU 202 to execute programs. The programs executed by the CPU 201 and the GPU 202 are stored in the ROM 204 and loaded into the RAM 203 when executed.

The communication unit 301 transmits and receives data to and from an external server via a network.

The storage unit 302 performs control of storing data and the like of an OS, web browsers, installed applications, which are started up on the VR terminal 101, in the ROM 204.

The camera control unit 303 controls the camera 207 and receives image data acquired from the camera 207.

The display unit 304 displays results of the OS, the web browsers, and the applications on the display 208. For example, the display unit 304 controls display of virtual objects and the like in the Metaverse.

The operation unit 305 receives and controls operations of the VR terminal 101 itself, gestures made by the user through the display unit 303, and operations on a controller connected to the VR terminal 101. For example, by physically double-tapping the VR terminal 101 itself, the operation unit 305 receives and controls operations such as displaying a web browser and closing an application. Further, the operation unit 305 projects an OS menu onto a real-world image acquired by the camera control unit 303 using AR technology, and receives and controls an operation such as opening the projected menu by tapping it with the user's hand. AR is an abbreviation for Augmented Reality.

The application unit 306 controls applications installed on the OS of the VR terminal 101. In addition, the application unit 306 stores user information handled by an application, code information for identifying data, and the like in the ROM 204 in cooperation with the storage unit 302.

The near-field wireless communication control unit 307 controls the wireless communication unit 206 to acquire peripheral device information through local communication and control transmission and reception of data to and from peripheral devices. Further, when near-field wireless communication is performed from an application, the near-field wireless communication control unit 307 transmits and receives data to and from a peripheral device in cooperation with an application unit.

<Hardware Configuration of Printing Device>

Figure 4:
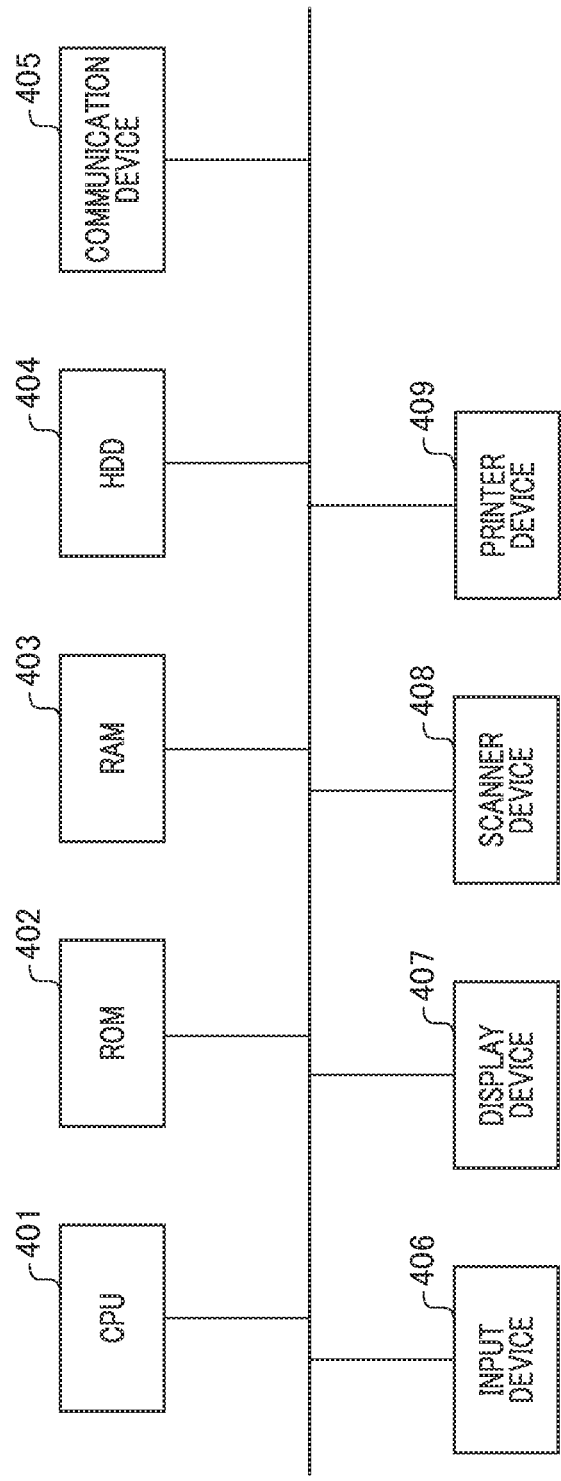
FIG. 4 is a block diagram illustrating an example of a hardware configuration of a printing device 102 illustrated in FIG. 1.

FIG. 4 is a block diagram illustrating an example of a hardware configuration of the printing device 102 illustrated in FIG. 1. The printing device 102 includes a CPU 401, a ROM 402, a RAM 403, an HDD 404, a communication device 405, an input device 406, a display device 407, a scanner device 408, and a printer device 409.

The CPU 401 comprehensively controls the entire hardware of the printing device 102 and executes functions such as printing and scanning.

The ROM 402 is a data read-only memory, and stores, for example, a basic control program for the printing device 102.

The RAM 403 is a data readable/writable memory, and is used as, for example, a working memory for the CPU 401.

The HDD 404 is used as a storage area for temporary data during execution of each program and permanent data.

The communication device 405 connects the printing device 102 to a LAN or the Internet and enables data communication between devices.

The input device 406 is an operation unit for receiving the user's operation of inputting characters and data. For example, the input device is a keyboard, a mouse, hard keys, and a touch panel.

The display device 407 is a device for displaying various screens, such as a liquid crystal display or a touch panel. The user gives an instruction via the input device 406 on a user interface screen displayed on the display device 407 to give a job execution instruction to the printing device 102.

The scanner device 408 is a device for scanning a document or the like placed on the printing device 102 by the user and converting it into electronic data.

The printer device 409 is a device for printing electronic data.

<Software Configuration of Printing Device>

Figure 5:
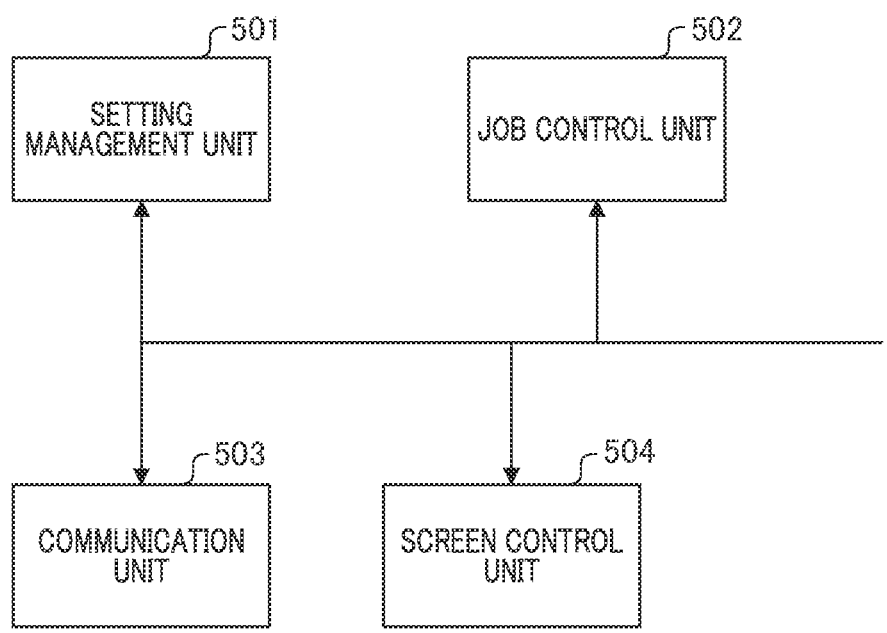
FIG. 5 is a block diagram illustrating an example of a software configuration of the printing device 102 illustrated in FIG. 1.

FIG. 5 is a block diagram illustrating an example of a software configuration of the printing device 102 illustrated in FIG. 1. The printing device 102 includes a setting management unit 501, a job control unit 502, a communication unit 503, and a screen control unit 504. Each configuration illustrated in FIG. 5 is implemented by causing the CPU 401 to execute programs. The programs executed by the CPU 401 are stored in the ROM 402 and loaded into the RAM 403 when executed.

The setting management unit 501 stores settings related to execution of various functions of the printing device 102 in storage devices such as the RAM 402 and the HDD 404 and reads them out from the storage devices. Here, the settings related to the execution of various functions include, for example, copy settings for executing a copy function, printing settings for executing a printing function, network settings, and individual identification information.

The job control unit 502 controls the scanner device 408 and the printer device 409 to execute various jobs based on job execution requests input from the input device 406 or received by the communication unit 403.

The communication unit 503 receives a printing job and a job execution request from the printing device management server 104. The communication unit 503 transmits and receives device information and the like by communicating with the VR terminal 101.

The screen control unit 504 displays a screen on the display device 407 and receives instructions from the user via the input device 406.

<Hardware Configuration of Server>

Figure 6:
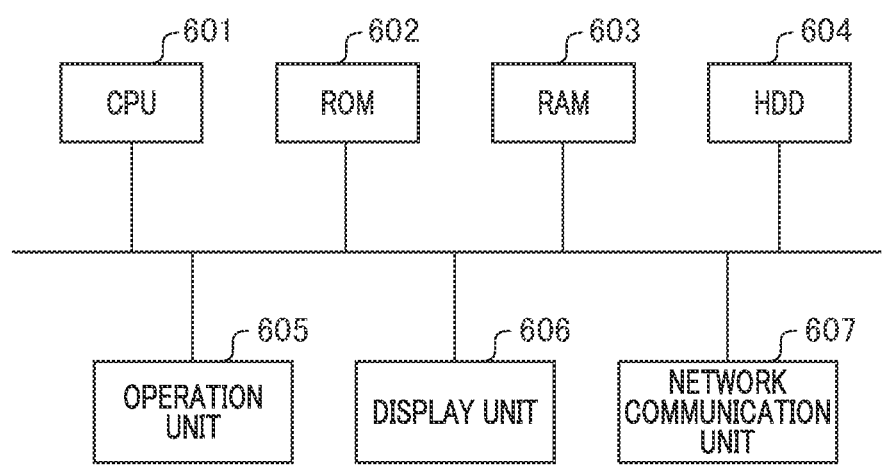
FIG. 6 is a block diagram illustrating an example of a hardware configuration of a Metaverse server 106 illustrated in FIG. 1.

FIG. 6 is a block diagram illustrating an example of a hardware configuration of the Metaverse server 106 illustrated in FIG. 1. The Metaverse server 106 includes a CPU 601, a ROM 602, a RAM 603, an HDD 604, an operation unit 605, a display unit 606, and a network communication unit 607.

The CPU 601 is a central processing unit for controlling each part of the Metaverse server 106.

The ROM 602 is a read-only memory for storing a boot program necessary for starting up the system.

The RAM 603 plays a role of a working memory required when the CPU 601 executes programs.

The HDD 604 is a device for storing programs to be executed by the CPU 601 and various information.

The operation unit 605 is a device for the user to perform various input operations, and is constituted by a keyboard, a mouse, and the like.

The display unit 606 is a device for displaying various information, such as a liquid crystal display.

The network communication unit 607 is connected to a network such as the Internet and performs a variety of communication.

It is assumed that the printing device management server 104 and the job management server 105 have the same hardware configuration as that of the Metaverse server 106, and a description thereof will be omitted. However, the printing device management server 104 and the job management server 105 may have hardware configurations different from that of the Metaverse server 106.

<Software Configuration of Metaverse Server>

Figure 7:
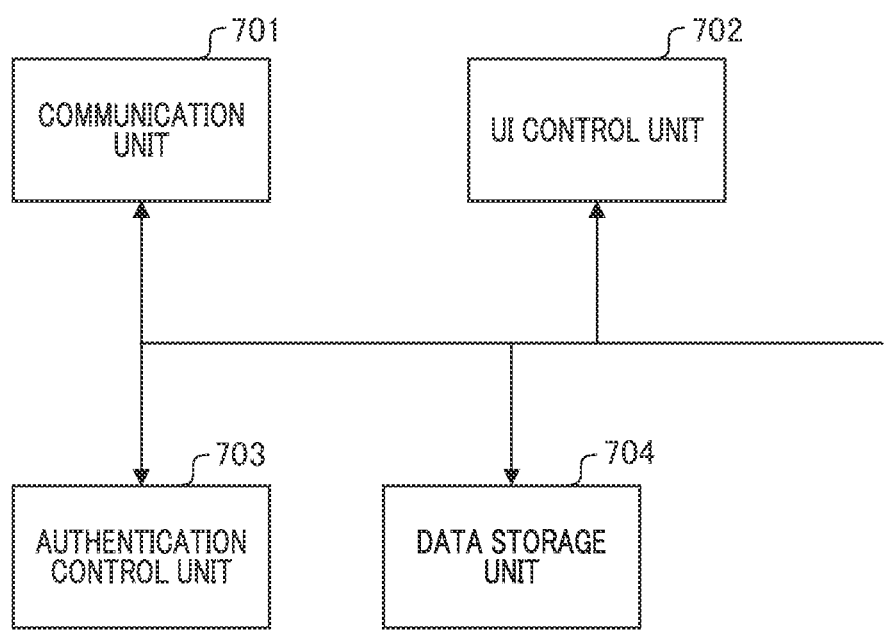
FIG. 7 is a block diagram illustrating an example of a software configuration of the Metaverse server 106 illustrated in FIG. 1.

FIG. 7 is a block diagram illustrating an example of a software configuration of the Metaverse server 106 illustrated in FIG. 1. The Metaverse server 106 include a communication unit 701, a UI control unit 702, an authentication control unit 703, and a data storage unit 704. UI is an abbreviation for User Interface. Each configuration illustrated in FIG. 7 is implemented by causing the CPU 601 to execute programs. The programs executed by the CPU 601 are stored in the ROM 602 and loaded into the RAM 603 when executed.

The communication unit 701 communicates with the VR terminal 101, the printing device management server 104, and the job management server 105, and transmits and receives processing requests.

The UI control unit 702 controls UI displayed on the VR terminal 101. The UI control unit 702 creates virtual object information such as a Metaverse space and transmits it to the VR terminal 101 via the communication unit 701.

The authentication control unit 703 performs user management. The user information is stored in the data storage unit 704 or a dedicated user management DB which is not illustrated in the drawing. DB is an abbreviation for Data Base. The user information may be obtained in cooperation with an external authentication service.

The data storage unit 704 stores data in response to a request from the authentication control unit 703. The data storage unit 704 also stores information and the like necessary for creating virtual objects in the Metaverse.

<Software Configuration of Job Management Server>

Figure 8:
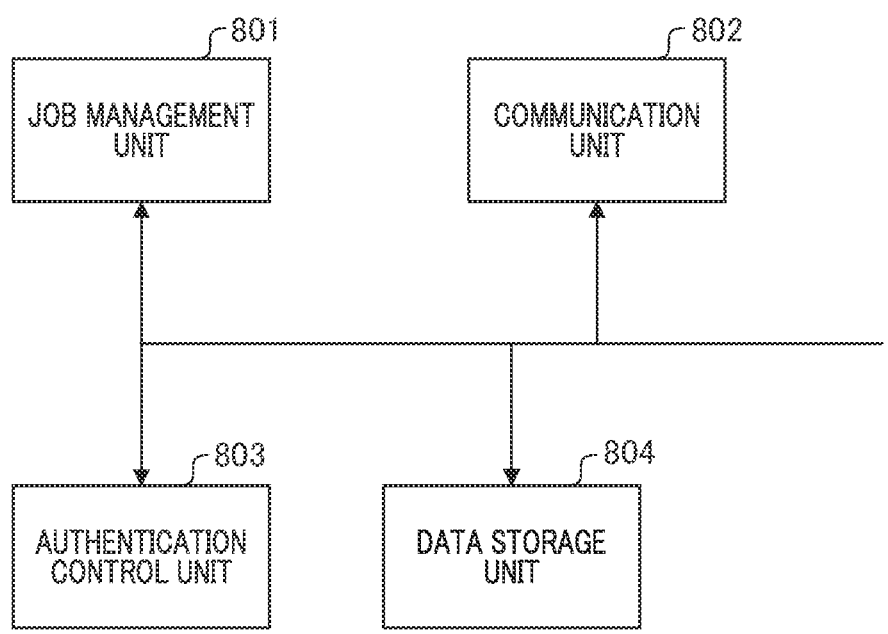
FIG. 8 is a block diagram illustrating an example of a software configuration of a job management server 105 illustrated in FIG. 1.

FIG. 8 is a block diagram illustrating an example of a software configuration of the job management server 105 illustrated in FIG. 1. The job management server 105 includes a job management unit 801, a communication unit 802, an authentication control unit 803, and a data storage unit 804. Each configuration illustrated in FIG. 8 is implemented by causing the CPU 601 of the job management server 105 to execute programs. The programs executed by the CPU 601 of the job management server 105 are stored in the ROM 602 of the job management server 105 and loaded into the RAM 603 of the job management server 105 when executed.

The job management unit 801 stores a printing job received from the Metaverse server 106 in the data storage unit 804.

The communication unit 802 communicates with the printing device 102 and the Metaverse server 106 to transmit and receive each processing request.

The authentication control unit 803 performs user management. User information is stored in the data storage unit 804 or a dedicated user management DB which is not illustrated in the drawing. DB is an abbreviation for Data Base. The user information may be obtained in cooperation with an external authentication service.

The data storage unit 804 stores data in response to a request from the job management unit 801 or the authentication control unit 803.

It is assumed that the printing device management server 104 has the same software configuration as that of the job management server 105, and a description thereof will be omitted. However, the printing device management server 104 may have a software configuration different from that of the job management server 105.

<Conceptual Diagram of System>

Figure 9:
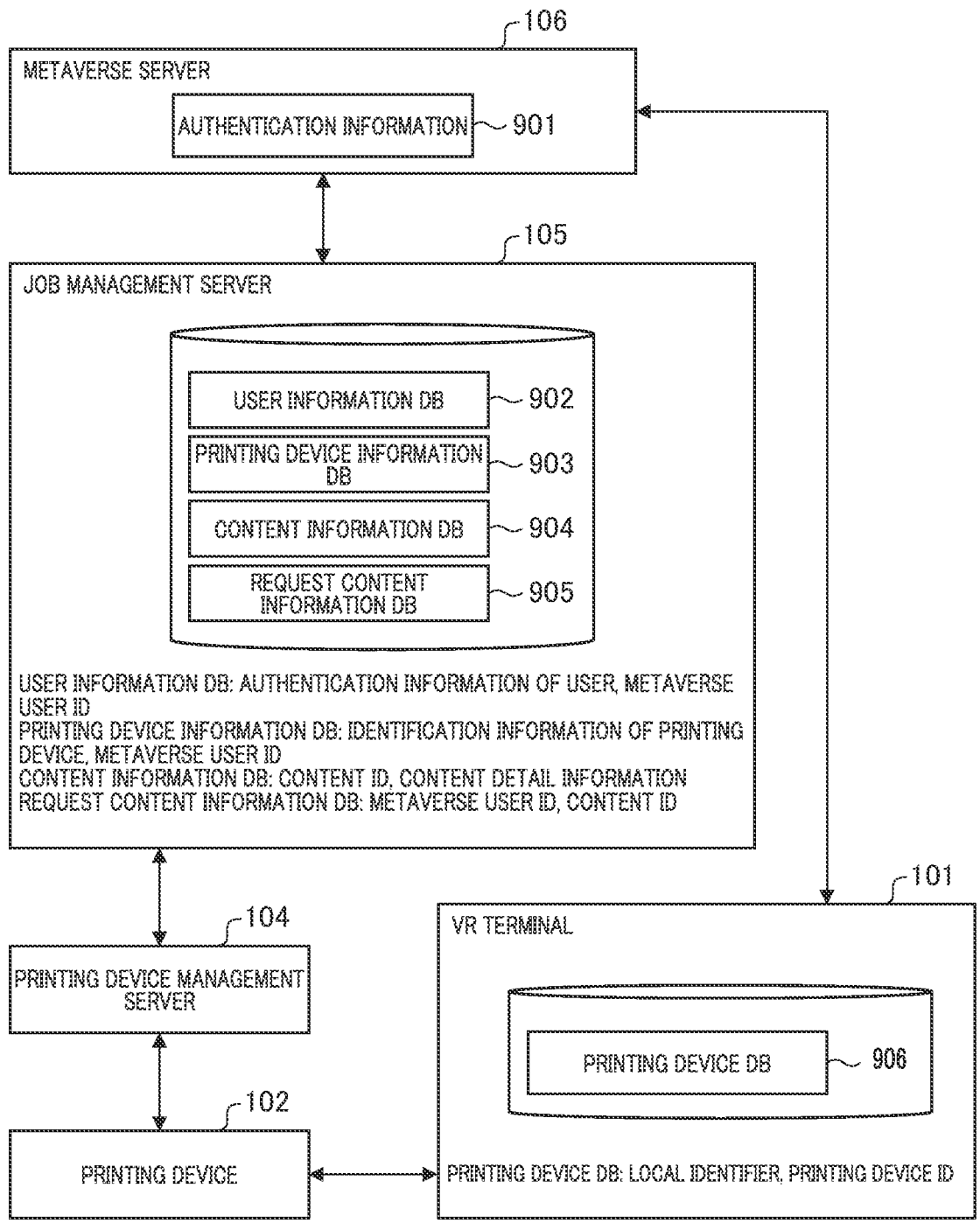
FIG. 9 is a block diagram illustrating a relationship of information handled by the system illustrated in FIG. 1.

FIG. 9 is a block diagram illustrating a relationship of information handled by the system illustrated in FIG. 1. The job management server 105 includes a user information DB 902, a printing device information DB 903, a content information DB 904, and a request content information DB 905. The VR terminal 101 includes a printing device DB 906.

The printing device DB 906 stores a local identifier and a printing device ID in association with each other. The local identifier is a value for identifying each printing device on a local network (anything that can uniquely identify the device, such as an IP address or a terminal name). Here, the local identifier is a value for identifying the printing device 102 on the local network. For example, when the VR terminal 101 transmits a printing job creation request to the job management server 105 via the Metaverse server 106, the VR terminal 101 also transmits the printing device ID.

The user information DB 902 stores authentication information 901, which is user authentication information, and a Metaverse user ID in association with each other. The Metaverse user ID is an ID by which each user can be identified in the Metaverse. The Metaverse user ID may be any information that can uniquely identify the user, such as a serial number of the VR terminal 101. The Metaverse user ID may be identification information based on both information on the user and information on the VR terminal 101.

The printing device information DB 903 stores the printing device 102 and the user in association with each other. Specifically, the printing device information DB 903 stores identification information (for example, a printing device ID) of the printing device 102 and the Metaverse user ID in association with each other.

The content information DB 904 stores a content ID by which a content can be identified and detailed content information, which is detailed information such as a file name of a file of the content, in association with each other. The file of the content is an example of content data.

The request content information DB 905 stores a Metaverse user ID and a content ID in association with each other. When the job management server 105 receives a request content information list acquisition request together with the Metaverse user ID from the printing device 102, the job management server 105 creates a list of the request content information DB 905 corresponding to the Metaverse user ID.

<Printing Device Registration Processing>

Next, registration processing in the system according to the first embodiment of the present disclosure will be described. This registration processing is processing for registering the user and the printing device 102 in association with each other so that the user can use the system according to the first embodiment of the present disclosure.

Figure 10:
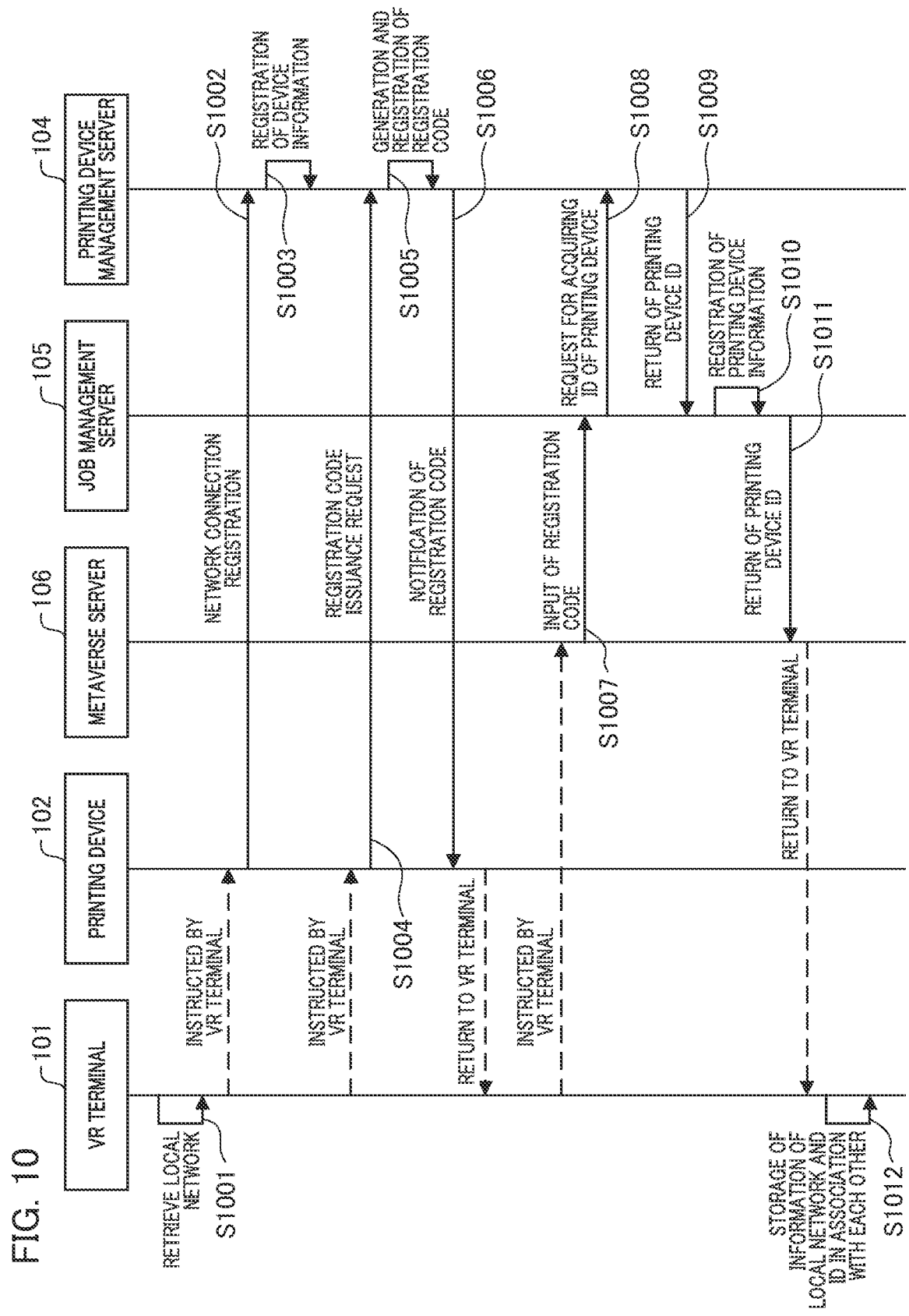
FIG. 10 is a sequence diagram illustrating printing device registration processing in the system according to the first embodiment of the present disclosure.

FIG. 10 is a sequence diagram illustrating printing device registration processing in the system according to the first embodiment of the present disclosure. The processing in FIG. 10 is processing executed between the VR terminal 101, the printing device 102, the printing device management server 104, the job management server 105, and the Metaverse server 106 illustrated in FIG. 1. Each step of the processing is denoted by a reference numeral prefixed with "S".

In S1001, the VR terminal 101 retrieves the inside of a connected local network, acquires information on connectable printing devices, and presents the information to the user. A display example of the presentation to the user will be described later with reference to FIG. 11A. The user performs an operation of selecting a printing device 102 to be used from among the presented connectable printing devices by using the VR terminal 101. In S1001, the VR terminal 101 receives an operation of selecting the printing device 102 by the user.

Upon receiving the user's operation of selecting the printing device 102, the VR terminal 101 transmits an instruction for requesting registration in this system to the selected printing device 102. At this time, the VR terminal 101 also transmits a Metaverse user ID, which is information by which the user can be uniquely identified, such as the serial number of the VR terminal 101, to the printing device 102. In S1002, the printing device 102 transmits a request for network connection registration to the printing device management server 104 in response to the reception of the instruction for requesting registration from the VR terminal 101. The network connection registration in S1002 is executed in response to an instruction from the user who operates the VR terminal 101. An example of display for the user on the VR terminal 101 at this time will be described later with reference to FIG. 11B.

In S1003, the printing device management server 104 registers device information of the printing device 102 in response to the reception of the request for network connection registration from the printing device 102 in S1002. The device information of the printing device 102 includes identification information of the printing device 102. The identification information of the printing device 102 is, for example, a local identifier of the printing device 102.

In response to the transmission of the instruction for requesting registration, the VR terminal 101 transmits an instruction for requesting the issuance of a registration code to the printing device 102 that has transmitted the instruction. In S1004, the printing device 102 transmits a registration code issuance request to the printing device management server 104 in response to the reception of the instruction for requesting the issuance of the registration code from the VR terminal 101. The registration code issuance request in S1004 is executed in response to an instruction from the user who operates the VR terminal 101. An example of display for the user on the VR terminal 101 at this time will be described later with reference to FIG. 11B.

In S1005, the printing device management server 104 generates a registration code for the printing device 102 in response to the reception of the registration code issuance request from the printing device 102 in S1004. The registration code can be any code as long as it is unique for each registration. In S1005, the printing device management server 104 registers a set of the device information of the printing device 102 and the registration code of the printing device 102 generated in S1005 as registration code information.

In S1006, the printing device management server 104 issues the registration code for the printing device 102 by notifying the printing device 102 of the registration code generated in S1005. The registration code is notified by the printing device management server 104 transmitting the registration code to the printing device 102. The printing device 102 returns the notified registration code to the VR terminal 101 in response to the reception of the issuance of the registration code in S1006. This registration code is returned by the printing device 102 transmitting the registration code to the VR terminal 101. The printing device 102 temporarily stores the returned registration code in response to the return of the registration code.

In response to the return of the registration code, the VR terminal 101 transmits an instruction for inputting the returned and temporarily stored registration code to the Metaverse server 106. At this time, the VR terminal 101 transmits the returned and temporarily stored registration code to the Metaverse server 106 together with an instruction for inputting the registration code. At this time, the VR terminal 101 also transmits the Metaverse user ID to the Metaverse server 106.

In S1007, the Metaverse server 106 inputs the registration code to the job management server 105 in response to the reception of the instruction for inputting the registration code from the VR terminal 101. This registration code is input by the Metaverse server 106 transmitting the registration code received from the VR terminal 101 to the job management server 105. At this time, the Metaverse server 106 also transmits the Metaverse user ID to the job management server 105.

In S1008, the job management server 105 requests the printing device management server 104 to acquire an ID of a printing device corresponding to the registration code received from the Metaverse server 106 in response to the reception of the registration code input from the Metaverse server 106. At this time, the job management server 105 also transmits the registration code input by the Metaverse server 106 to the printing device management server 104 together with the request for acquiring the ID of the printing device corresponding to the registration code. Here, the ID of the printing device corresponding to the registration code received from the Metaverse server 106 is the printing device ID of the printing device 102.

In S1009, the printing device management server 104 returns the printing device ID corresponding to the registration code received from the job management server 105 to the job management server 105 in response to the reception of the request for acquiring the ID of the printing device from the job management server 105. The printing device ID is returned by the printing device management server 104 transmitting the printing device ID of the printing device corresponding to the registration code to the job management server 105.

In S1010, the job management server 105 registers the returned printing device ID and the Metaverse user ID received in S1007 in association with each other as printing device information in response to the reception of the returned printing device ID from the printing device management server 104. The printing device information is registered by registering the printing device ID as identification information of the printing device 102 and the Metaverse user ID in the printing device information DB 903 in association with each other.

In S1011, the job management server 105 returns the printing device ID registered in S1010 to the Metaverse server 106 in response to the completion of registration of the printing device information. This printing device ID is returned by the job management server 105 transmitting the printing device ID to the Metaverse server 106.

Upon receiving the printing device ID from the job management server 105, the Metaverse server 106 returns the received printing device ID to the VR terminal 101. This printing device ID is returned by the Metaverse server 106 transmitting the printing device ID to the VR terminal 101.

In S1012, the VR terminal 101 registers the local identifier of the printing device 102 and the printing device ID in the printing device DB 906 in association with each other in response to the reception of the printing device ID from the Metaverse server 106.

<Display Example of VR Terminal in Printing Device Registration Processing>

Figure 11A:
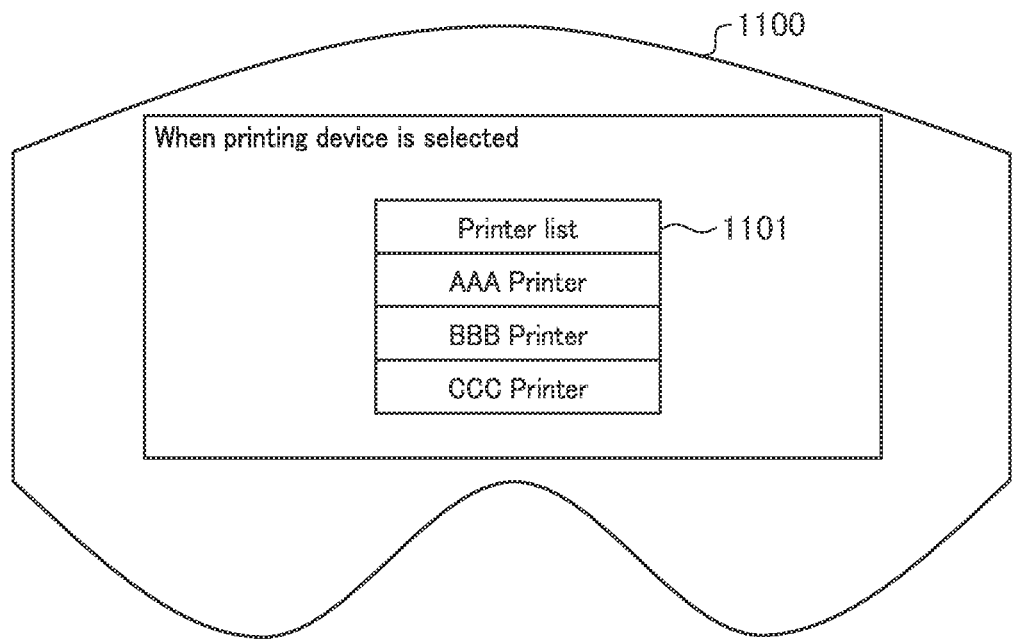
FIGS. 11A and 11B are diagrams illustrating a display example of a display unit 304 of the VR terminal 101 in the printing device registration processing.
Figure 11B:
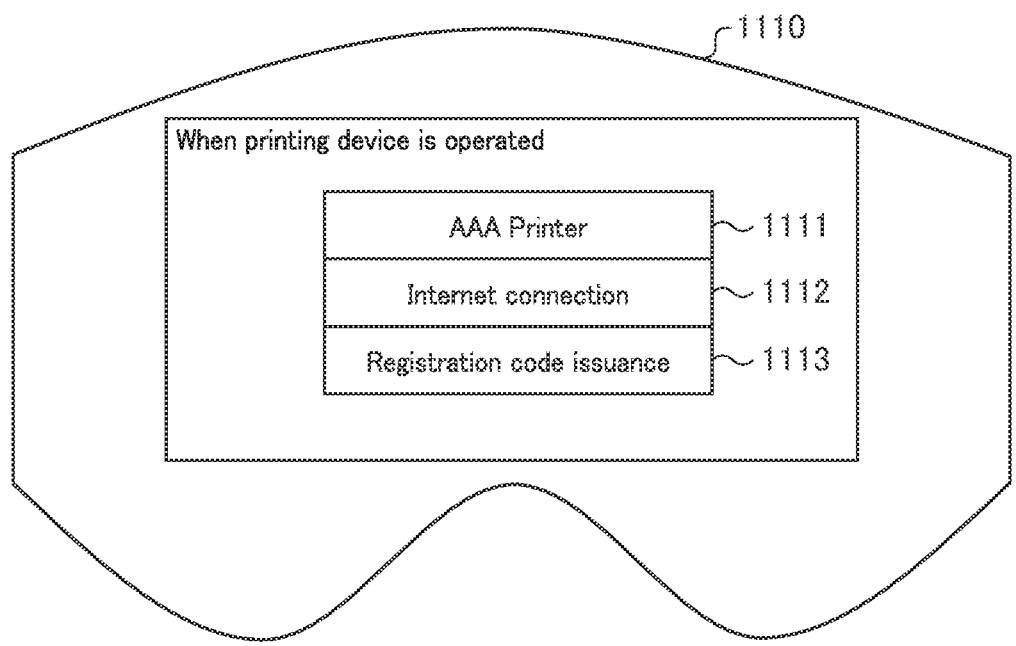

FIGS. 11A and 11B are diagrams illustrating a display example of the display unit 304 of the VR terminal 101 in the printing device registration processing. FIG. 11A is a diagram illustrating a display example in which the VR terminal 101 acquires information on connectable printing devices and presents the information to the user in S1001 of FIG. 10. FIG. 11B is a diagram illustrating a display example at a point in time of network connection registration in S1002 and the registration code issuance request in S1004 of FIG. 10.

As illustrated in FIG. 11A, the display unit 304 of the VR terminal 101 displays a printing device selection screen 1100 in accordance with the user's operation. The printing device selection screen 1100 shows a GUI framework in the VR terminal 101. The display unit 304 displays a list of connectable printing devices 102 in an area 1101 of the printing device selection screen 1100.

The user selects a printing device 102 to be registered this time from the list displayed in the area 1101 of the printing device selection screen 1100. This selection can be performed, for example, by pressing a button assigned to the area 1101. Here, it is assumed that the name of the printing device 102 is a "AAA printer", and the name of the printing device 102 "AAA printer" is displayed in the area 1101.

As illustrated in FIG. 11B, the display unit 304 of the VR terminal 101 displays the printing device operation screen 1110 by the user's operation. The printing device operation screen 1110 shows a GUI framework in the VR terminal 101. The display unit 304 displays a disposed button for operating the printing device 102 in an area 1111 of the printing device operation screen 1110.

At the uppermost stage of the area 1111, the "AAA printer", which is the name of the printing device 102 and is a printer to be operated, is displayed. The display unit 304 displays buttons 1112 and 1113 in the area 1111. The buttons 1112 and 1113 display operation contents of the printing devices 102 that are assigned thereto.

"Internet connection" is displayed in the button 1112. When the user selects the button 1112 by pressing it or the like, processing for transmitting the network connection registration request in S1002 of FIG. 10 is executed.

"Issue registration code" is displayed in the button 1113. When the user selects the button 1113 by pressing it or the like, processing for transmitting the registration code issuance request in S1004 of FIG. 10 is executed.

Through the processing described above, the user of the VR terminal 101 can register printing device information in which the printing device 102 and the user are associated with each other in the job management server 104.

<Content Registration Processing>

Next, in the system according to the first embodiment of the present disclosure, a description will be given of processing from when an exhibitor of a booth in the Metaverse stores a content in the job management server 105 to when the exhibitor receives a content ID.

FIG. 12 is a sequence diagram illustrating content registration processing in the system according to the first embodiment of the present disclosure. The processing in FIG. 12 is processing executed between the VR terminal 101, the job management server 105, and the Metaverse server 106 illustrated in FIG. 1.

First, a user who is an exhibitor operates the VR terminal 101 to instruct the registration of a content. In S1201, the Metaverse server 106 executes processing for selecting an event in which the user participates, in response to the reception of the instruction from the VR terminal 101. The user operates the VR terminal 101 and selects an event in which the user is to participate. A selection screen for this event will be described later with reference to FIG. 13A.

In S1202, the Metaverse server 106 executes processing for selecting a booth hosted by the user in response to the selection of the event in which the user participates in S1201. The user operates the VR terminal 101 and selects a booth hosted by the user. A selection screen for this booth will be described later with reference to FIG. 13B.

In S1203, the Metaverse server 106 executes processing for selecting a file of a content stored by the user in response to the selection of the booth hosted by the user in S1202. The user operates the VR terminal 101 to select a file stored by the user. In S1204, the Metaverse server 106 executes processing for uploading the selected file to the job management server 105 in response to the selection of the file stored by the user in S1203. A screen for uploading the file will be described later with reference to FIG. 13C.

In S1205, the job management server 105 stores the uploaded file in response to the reception of the uploaded file from the Metaverse server 106 in S1204.

In S1206, the job management server 105 generates a content ID of the file stored this time in response to the storage of the file in S1205. The content ID may be any ID as long as it is unique for each content. In S1207, the job management server 105 stores a set of the content ID generated in S1206, a file name of the stored file, and information of a storage location in the content information DB 904 as content information.

In S1208, the job management server 105 returns the content ID to the Metaverse server 106 in response to the storage of the content information in the content information DB 904 in S1206. The content ID is returned by the job management server 105 transmitting the content ID corresponding to the uploaded file to the Metaverse server 106.

In S1209, the Metaverse server 106 stores the returned content ID in association with the booth in response to the reception of the returned content ID from the job management server 105.

<Display Example of VR Terminal in Content Registration Processing>

Figure 13A:
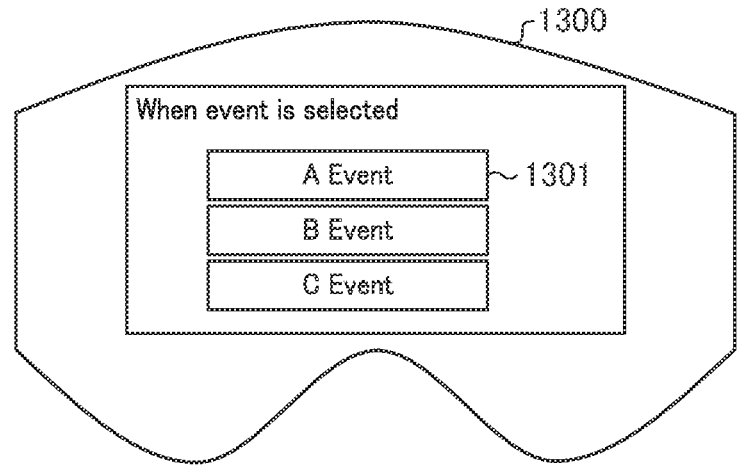
FIGS. 13A to 13C are diagrams illustrating a display example of the display unit 304 of the VR terminal 101 in content registration processing.
Figure 13B:
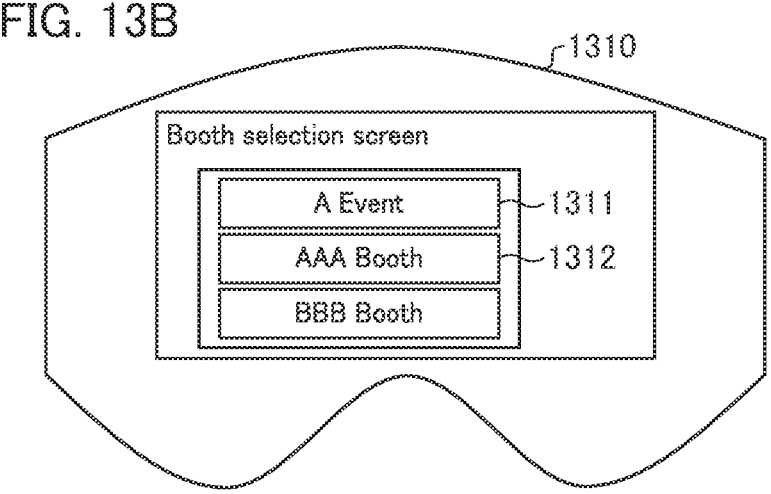
Figure 13C:
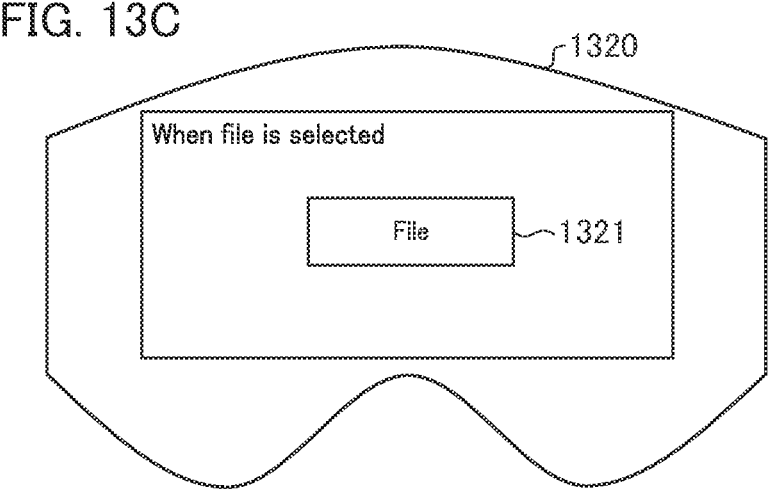

FIGS. 13A to 13C are diagrams illustrating a display example of the display unit 304 of the VR terminal 101 in the content registration processing.

FIG. 13A is a diagram illustrating a display example of an event selection screen on which the user selects an event to participate in from a list of events in the Metaverse server 106 in S1201 of FIG. 12. An event selection screen 1300 shows a GUI framework in the VR terminal 101. The display unit 304 displays the list of the events in an area 1301 of the event selection screen 1300. The user can select an event to participate in, for example, by pressing a button provided corresponding to each of the events of the list in the area 1301. The display unit 304 changes the display screen to a booth selection screen in FIG. 13B in response to the user's selection of the event to participate in from the list in the area 1301.

FIG. 13B is a diagram illustrating a display example of a booth selection screen for the user to select a booth hosted by the user from a list of booths in S1202 of FIG. 12. A booth selection screen 1310 shows a GUI framework in the VR terminal 101. An event name of an event to participate in is displayed in the area 1311 of the booth selection screen 1310 on the display unit 304. A list of booths is displayed in an area 1312 of the booth selection screen 1310 on the display unit 304. The user can select a booth hosted by the user, for example, by pressing a button provided corresponding to each of the booths of the list in the area 1312. The display unit 304 changes the display screen to a screen for selecting a file to be uploaded, in response to the user's selection of the hosted booth from the list in the area 1312.

The screen for selecting a file to be uploaded is a screen on which a list of files to be selected is displayed, like the event selection screen and the booth selection screen described above, and thus the screen for selecting a file to be uploaded is not illustrated here. The display unit 304 changes the display screen to an upload screen in FIG. 13C in response to the selection of the file to be uploaded from the list of files on the screen for selecting a file to be uploaded.

FIG. 13C is a diagram illustrating a display example of a screen on which the user executes file uploading in S1204 of FIG. 12. An upload screen 1320 shows a GUI framework in the VR terminal 101. A file name, thumbnail, and the like of a file to be uploaded are displayed in an area 1321 of the upload screen 1320 on the display unit 304. The user can instruct execution of uploading by pressing a button provided corresponding to the area 1321, or the like.

As described above, the user registers a content in the job management server 105 by uploading the content from the Metaverse server 106 or a local folder.

<Content Acquisition Request Registration Processing>

Next, processing for a user to request the acquisition of a content and register the content in the system according to the first embodiment of the present disclosure will be described.

FIG. 14 is a sequence diagram illustrating content acquisition request registration in the system according to the first embodiment of the present disclosure. The processing in FIG. 14 is processing executed between the VR terminal 101, the job management server 105, and the Metaverse server 106 illustrated in FIG. 1.

First, a user who acquires a content operates the VR terminal 101 to instruct acquisition of information on each booth in the Metaverse. The VR terminal 101 transmits this instruction to the Metaverse server 106. Thereafter, instructions given by the user by operating the VR terminal 101 are transmitted to the Metaverse server 106.

In S1401, the Metaverse server 106 provides information on each booth in the Metaverse to the VR terminal 101 in response to the reception of the instruction for acquiring the information on each booth in the Metaverse from the VR terminal 101. The VR terminal 101 displays the information of each booth in the Metaverse which is provided by the Metaverse server 106. The user can visit the booth and confirm the content of the booth by referring to the information of each booth in the Metaverse which is displayed on the VR terminal 101.

The user confirms the content of the booth that the user has visited, and when the user wants the content of the booth, the user operates the VR terminal 101 to give an instruction for acquiring the content. In S1402, the Metaverse server 106 transmits a content request including a Metaverse user ID of the user and a content ID of the requested content to the job management server 105 in response to the reception of the instruction for acquiring the content from the VR terminal 101.

In S1403, when the job management server 105 receives the content request from the Metaverse server 106, the job management server 105 creates request content information in which the Metaverse user ID and the content ID included in the received content request are associated with each other. The job management server 105 also registers the request content information by storing the created request content information in the request content information DB 905. The Metaverse user ID is an example of user identification information. The content ID is an example of content identification information. The job management server 105 manages the user identification information and the content identification information in association with each other.

In S1404, the job management server 105 returns a registration completion notification to the Metaverse server 106 in response to the storage of the request content information in the request content information DB 905. The Metaverse server 106 returns the registration completion notification to the VR terminal 101 in response to the reception of the returned registration completion notification. Upon receiving the returned registration completion notification, the VR terminal 101 displays and notifies the user that the request for content acquisition has been registered.

<Display Example of VR Terminal in Content Acquisition Request Registration Processing>

Figure 15A:
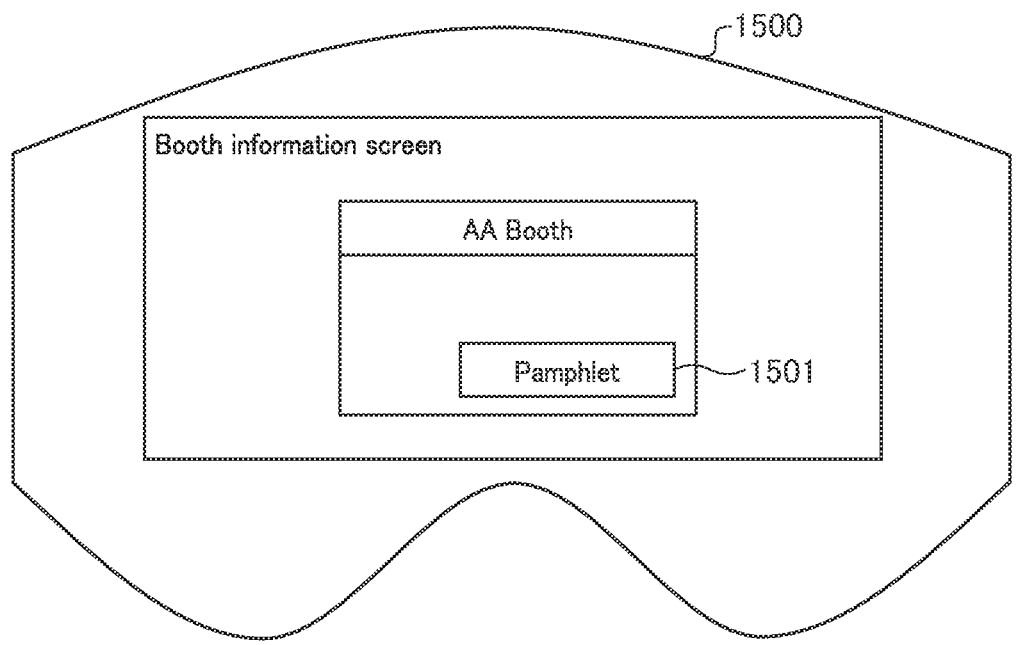
FIGS. 15A and 15B are diagrams illustrating a display example of the display unit 304 of the VR terminal 101 in content acquisition request registration processing.
Figure 15B:
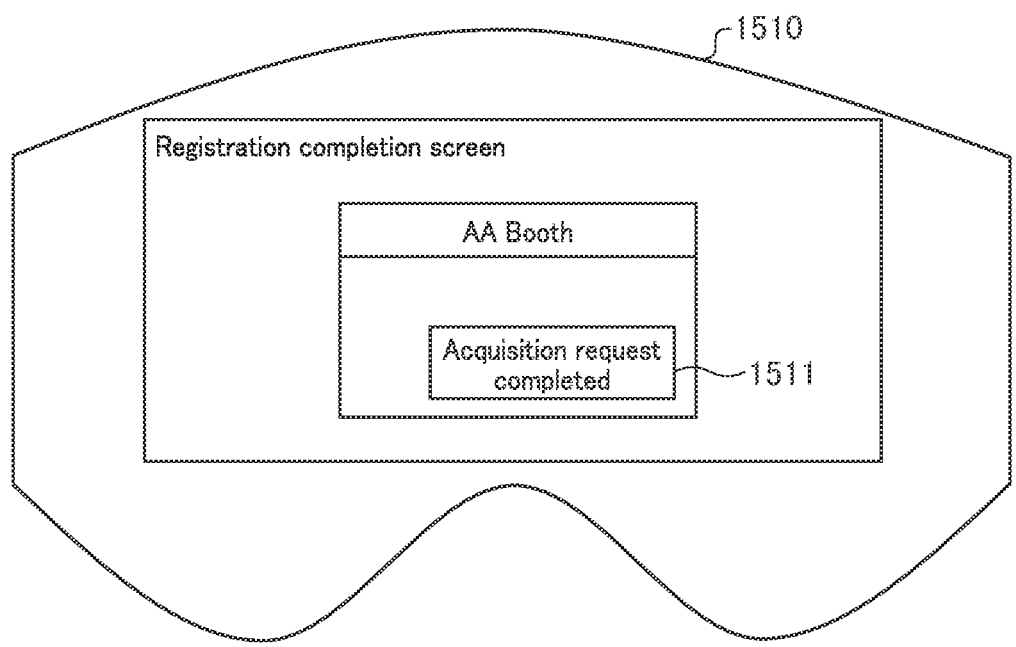

FIGS. 15A and 15B are diagrams illustrating a display example of the display unit 304 of the VR terminal 101 in content acquisition request registration processing.

FIG. 15A is a diagram illustrating a display example of a booth information screen that displays information on a booth when the user visits the booth in S1401 of FIG. 14. A booth information screen 1500 shows a GUI framework in the VR terminal 101. The display unit 304 displays a request button for requesting a content in an area 1501 of the booth information screen 1500. A content name is also displayed in the area 1501. The user can transmit a request for acquiring the content by pressing the button displayed in area 1501. After the user presses the button displayed in the area 1501, the display unit 304 changes the display screen to a registration completion screen in FIG. 15B in response to the reception of the returned registration completion notification in S1404.

FIG. 15B is a diagram illustrating a display example of a registration completion screen when the user requests the acquisition of a content in S1404 of FIG. 14 and has completed the registration thereof. A registration completion screen 1510 shows a GUI framework in the VR terminal 101. The display unit 304 displays a message indicating that the registration of the acquisition request has been completed in an area 1511 of the registration completion screen 1510. Thereby, the user can confirm that the content acquisition request has been completed.

<Content Printing Processing (Instructed from VR Terminal)>

Next, processing for acquiring and printing a list of contents requested by the user from the VR terminal 101 in the system according to the first embodiment of the present disclosure will be described.

FIG. 16 is a sequence diagram illustrating content printing processing instructed from the VR terminal in the system according to the first embodiment of the present disclosure. The processing of FIG. 16 is processing executed between the VR terminal 101, the printing device 102, the printing device management server 104, the job management server 105, and the Metaverse server 106 illustrated in FIG. 1.

First, the user operates the VR terminal 101 to give an instruction for acquiring a content list. The content list is a list of contents for which a request for acquisition has already been registered by the user through the content acquisition request registration processing in FIG. 14. In S1601, the Metaverse server 106 transmits a content list request to the job management server 105 in response to the reception of the instruction from the VR terminal 101. The content list request includes a Metaverse user ID of the user who has requested the content list.

In S1602, the job management server 105 acquires the content list from the request content information DB 905 in response to the reception of the content list request from the Metaverse server 106. Specifically, the job management server 105 acquires a list of request content information including the Metaverse user ID included in the received content list request from the request content information DB 905 as a content list.

In S1603, the job management server 105 returns the acquired content list to the Metaverse server 106 in response to the acquisition of the content list. The Metaverse server 106 transmits the content list to the VR terminal 101 in response to the reception of the returned content list.

In S1604, the VR terminal 101 displays the received content list in response to the reception of the content list, and receives the user's selection of a content to be printed. The user selects a content to be printed from the content list displayed on the VR terminal 101.

In S1605, the VR terminal 101 displays a list of printable printers in response to the reception of the selection of the content to be printed, and receives the user's selection of the printer for printing. The user selects the printer for printing from the list of printers displayed on the VR terminal 101. The printable printer is a printer that has been registered in the system and that is present on the local network. Here, description is given on the assumption that the printing device 102 has been selected.

In S1606, the VR terminal 101 displays a list of printing settings that can be performed by the selected printer in response to the reception of the selection of the printer for printing, and receives the user's selection of printing settings. The user operates the VR terminal 101 and gives an instruction for executing printing when the selection of the printing settings is completed. The VR terminal 101 transmits a content printing request to the Metaverse server 106 in response to the selection of the printing settings and the reception of the instruction for executing printing. The content printing request includes a content ID of a content to be printed, identification information of a printing device to perform printing, and printing settings when the printing is performed. In S1607, the Metaverse server 106 transmits the content printing request to the job management server 105 in response to the reception of the content printing request.

In S1608, the job management server 105 acquires content information from the content information DB 904 in response to the reception of the content printing request. Specifically, the job management server 105 acquires content information including the content ID included in the received content printing request from the content information DB 904. The content information includes information on a storage location where a file of a content is stored, and the job management server 105 acquires the file of the content using the information on the storage location.

In S1609, the job management server 105 generates a printing job for printing the content of the acquired content information in response to the acquisition of the content information. Specifically, the job management server 105 generates a printing job for printing the content of the acquired content information using the printing device and the printing settings selected in accordance with the information included in the received content printing request.

In S1610, the job management server 105 transmits a printing request to the printing device management server 104 in response to the generation of the printing job. This printing request includes the printing job generated in S1609.

In S1611, the printing device management server 104 transmits a printing command execution to the printing device 102 in response to the reception of the printing request from the job management server 105. The printing command execution includes the printing job included in the printing request received in S1610. The printing device 102 to which the printing command execution is transmitted is a printing device designated by the printing job included in the printing request received in S1610. In S1612, the printing device 102 prints the content in response to the reception of the printing command execution from the printing device management server 104.

As described above, the user can acquire a list of requested contents from the job management server 105 and print a selected file by the printing device 102.

<Display Example of VR Terminal in Content Printing Processing>

FIGS. 17A to 17D are diagrams illustrating a display example of the display unit 304 of the VR terminal 101 in content printing processing.

Figure 17A:
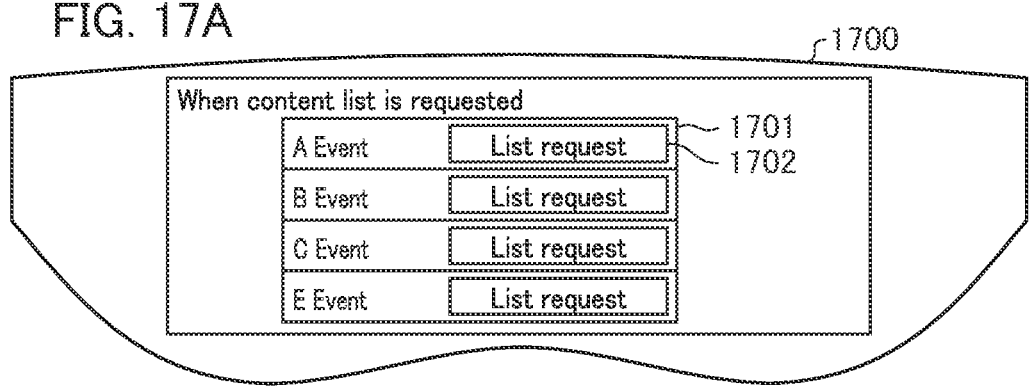
FIGS. 17A to 17D are diagrams illustrating a display example of the display unit 304 of the VR terminal 101 in content printing processing.

FIG. 17A is a diagram illustrating a display example presented to the user when the user operates the VR terminal 101 to give an instruction for acquiring a content list. A content list request screen 1700 is a diagram illustrating a GUI framework in the VR terminal 101. The display unit 304 displays a list of events in which the user has participated in an area 1701 of the content list request screen 1700.

The display unit 304 displays a button for requesting a content list in an area 1702 of the content list request screen 1700. The user can transmit a request for acquiring a content list of the events by pressing the button displayed in the area 1702. After the user presses the button displayed in the area 1702, the display unit 304 changes the display screen to a content list screen in FIG. 17B in response to the reception of the returned content list in S1603.

Figure 17B:
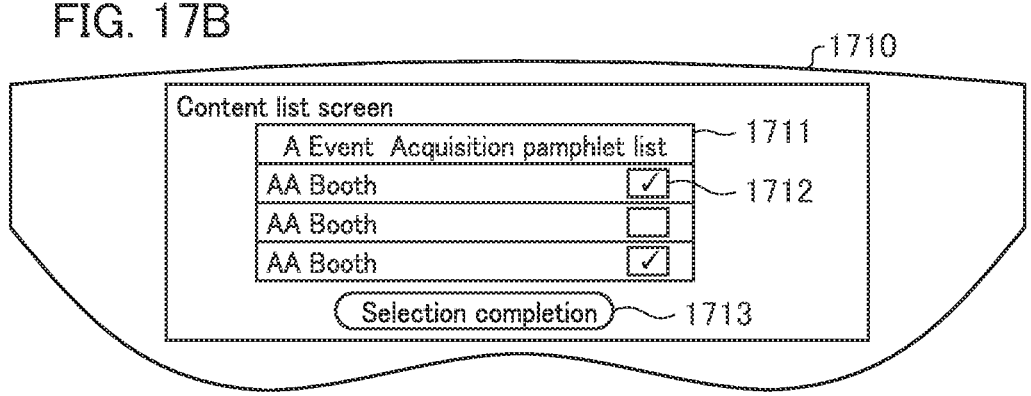

FIG. 17B is a diagram illustrating a display example presented to the user when the user operates the VR terminal 101 to select a content to be printed in S1604 of FIG. 16. A content list request screen 1710 is a diagram illustrating a GUI framework in the VR terminal 101. The display unit 304 displays a list of contents requested by the user in an area 1711 of the content list request screen 1710.

The display unit 304 displays a check box for selecting a content to be printed in an area 1712 of the content list request screen 1710. The user can request the printing of the content by checking the check box displayed in the area 1712. As long as a content to be printed can be selected, any display method other than the display of the check box may be used.

The display unit 304 displays a selection completion button in an area 1713 of the content list request screen 1710. The user presses the selection completion button in the area 1713 when the selection of the content to be printed is completed. When the user presses the selection completion button in the area 1713, the display unit 304 changes the display screen to a printer selection screen in FIG. 17C.

Figure 17C:
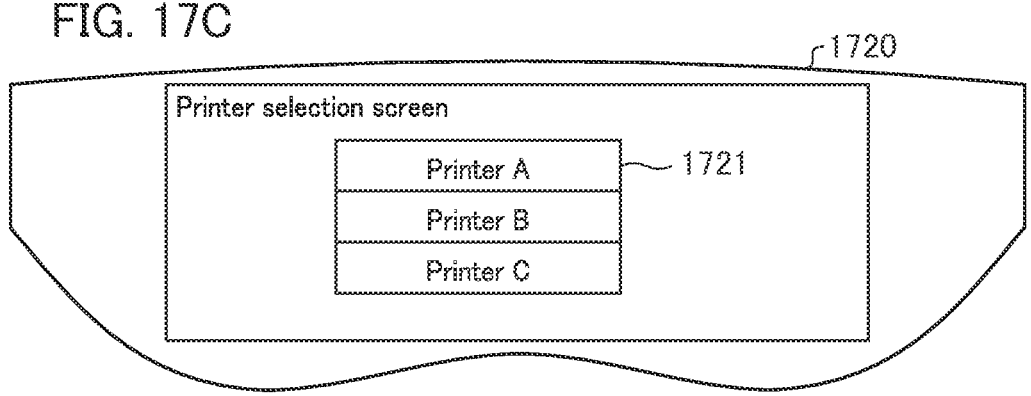

FIG. 17C is a diagram illustrating a display example presented to the user when the user operates the VR terminal 101 to select a printer for printing in S1605 of FIG. 16. A printer selection screen 1720 is a diagram illustrating a GUI framework in the VR terminal 101. The display unit 304 displays a list of usable printers in an area 1721 of the printer selection screen 1720. The user selects a printer to be used for printing this time from among the printers displayed in the area 1721. The display unit 304 changes the display screen to a printing setting screen in FIG. 17D in response to the user's selection of the printer to be used for printing this time from among the printers displayed in the area 1721.

Figure 17D:
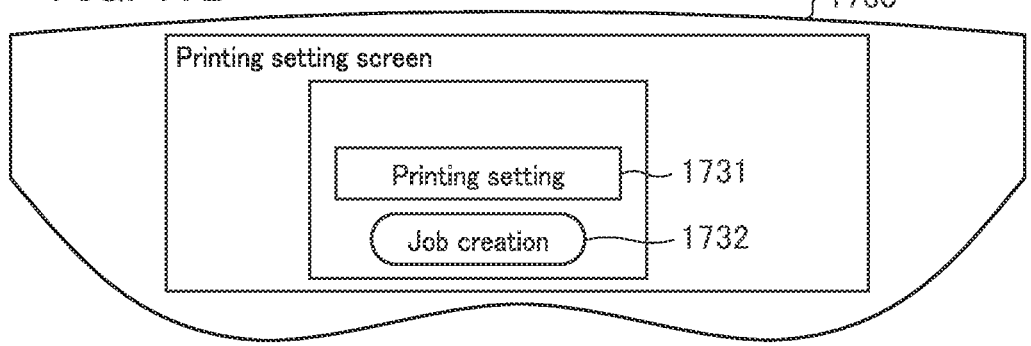

FIG. 17D is a diagram illustrating a display example presented to the user when the user operates the VR terminal 101 to select printing settings in S1606 of FIG. 16. A printing setting screen 1730 is a diagram illustrating a GUI framework in the VR terminal 101. The display unit 304 displays a button for changing the display screen to a screen for setting details of printing settings in an area 1731 of the printing setting screen 1730. When the button in the area 1731 is pressed, the display unit 304 displays a screen for setting details of printing settings that can be set by the printer set on the printer selection screen 1720. Specifically, the printing settings include the number of printing copies, a paper size, a layout, a double-sided printing setting, printing color settings, a printing range, and the like. The printing settings are not limited to these settings, and any known settings may be used. The printing settings may be equipped with a function of receiving an input in an input box or a selection box.

The display unit 304 displays a job creation button in an area 1732 of the printing setting screen 1730. The user presses the job creation button in the area 1732 when the printing settings are completed. The VR terminal 101 transmits a content printing request to the Metaverse server 106 in response to the user's pressing of the job creation button in the area 1732.

As described above, the user presses the button in the area 1731 to edit the printing settings on the displayed screen and presses the job creation button in the area 1732, so that the job management server 105 can generate, issue, and print a printing job.

<Content Printing Processing (Instructed from Printing Device)>

Next, processing in which the user operates the printing device 102 to acquire a list of contents and prints the list in the system according to the first embodiment of the present disclosure will be described.

Figure 18:
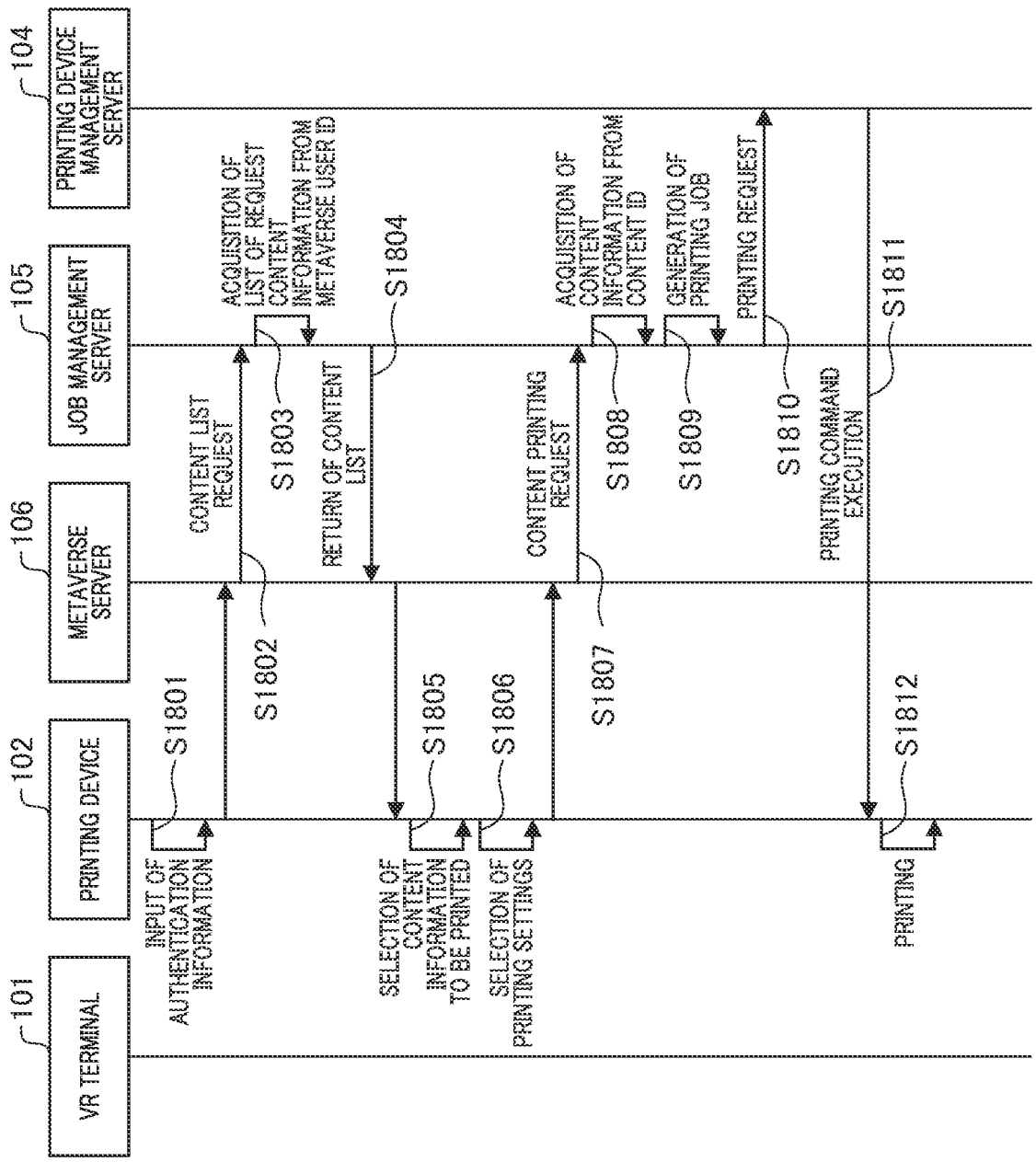
FIG. 18 is a sequence diagram illustrating content printing processing instructed from the printing device in the system according to the first embodiment of the present disclosure.

FIG. 18 is a sequence diagram illustrating content printing processing instructed from a printing device in the system according to the first embodiment of the present disclosure. The processing of FIG. 18 is processing executed between the printing device 102, the printing device management server 104, the job management server 105, and the Metaverse server 106 illustrated in FIG. 1.

First, in S1801, the printing device 102 receives the user's input of authentication information, confirms that the user is valid, and confirms the user's Metaverse user ID. Information used for authentication may be a Metaverse user ID, a set of a Metaverse user ID and a password, or the serial number of the VR terminal 101. When the authentication is completed, the user operates the printing device 102 to give an instruction for acquiring a content list. The printing device 102 transmits a content list request to the Metaverse server 106 in response to the user's operation.

In S1802, the Metaverse server 106 transmits the content list request to the job management server 105 in response to the reception of the content list request from the printing device 102.

In S1803, the job management server 105 acquires a content list from the request content information DB 905 in response to the reception of the content list request from the Metaverse server 106. Specifically, the job management server 105 acquires a list of request content information including the Metaverse user ID, which is included in the received content list request, from the request content information DB 905 as a content list.

In S1804, the job management server 105 returns the acquired content list to the Metaverse server 106 in response to the acquisition of the content list. The Metaverse server 106 transmits the content list to the printing device 102 in response to the reception of the returned content list.

In S1805, the printing device 102 displays the received content list in response to the reception of the content list, and receives the user's selection of a content to be printed. The user selects the content to be printed from the content list displayed on the printing device 102.

In S1806, the printing device 102 displays a list of printing settings available in the printing device 102 in response to the reception of the selection of the content to be printed, and receives the user's selection of printing settings. The user operates the printing device 102 and gives an instruction for executing printing when the selection of printing settings is completed. The printing device 102 transmits a content printing request to the Metaverse server 106 in response to the reception of the selection of the printing settings and the instruction for executing printing. In S1807, the Metaverse server 106 transmits the content printing request to the job management server 105 in response to the reception of the content printing request.

In S1808, the job management server 105 acquires content information from the content information DB 904 in response to the reception of the content printing request. In S1809, the job management server 105 generates a printing job for printing a content of the acquired content information in response to the acquisition of the content information. In S1810, the job management server 105 transmits a printing request to the printing device management server 104 in response to the generation of the printing job.

In S1811, the printing device management server 104 transmits a printing command execution to the printing device 102 in response to the reception of the printing request from the job management server 105. In S1812, the printing device 102 prints the content in response to the reception of the printing command execution from the printing device management server 104.

As described above, the user can acquire a list of requested contents from the job management server 105 and print a selected file by the printing device 102.

<Display Example of Printing Device in Content Printing Processing>

FIGS. 19A to 19D are diagrams illustrating a display example of a display device 407 of the printing device 102 in content printing processing.

Figure 19A:
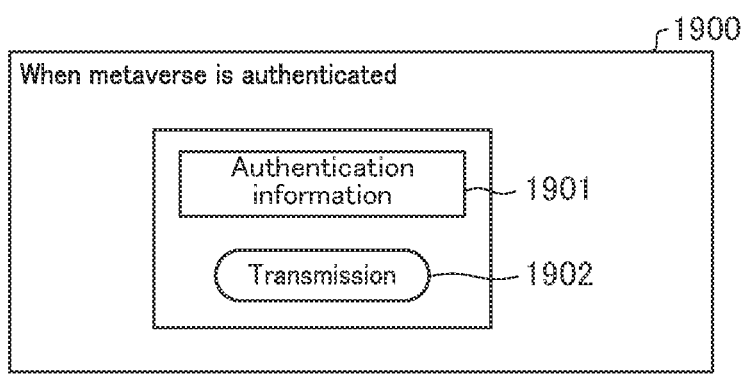
FIGS. 19A to 19D are diagrams illustrating a display example of a display device 407 of the printing device 102 in content printing processing.

FIG. 19A is a diagram illustrating a display example presented to the user when the printing device 102 performs user authentication in S1801 of FIG. 18. An authentication information input screen 1900 is a diagram illustrating a GUI framework in the printing device 102. The display device 407 displays an area for the user to input authentication information to the Metaverse server 106 in an area 1901 of the authentication information input screen 1900. The user inputs the authentication information to the area 1901. The display device 407 displays a button for transmitting authentication information in an area 1902 of the authentication information input screen 1900. The display device 407 changes the display screen to a content list request screen in FIG. 19B in response to the user's pressing of the button displayed in the area 1902.

Figure 19B:
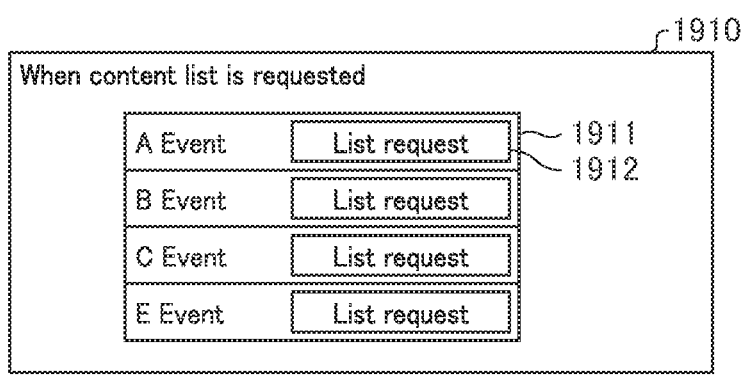

FIG. 19B is a diagram illustrating a display example presented to the user when the user operates the printing device 102 to give an instruction for acquiring a content list. The content list request screen 1910 is a diagram illustrating a GUI framework in the printing device 102. The display device 407 displays a list of events in which the user has participated in an area 1911 of the content list request screen 1910.

The display device 407 displays a button for requesting a content list in an area 1912 of the content list request screen 1910. The user can transmit a request for acquiring the content list of the events by pressing a button displayed in the area 1912. After the user presses the button displayed in the area 1912, the display device 407 changes the display screen to the content list screen in FIG. 19C in response to the reception of the returned content list in S1804.

Figure 19C:
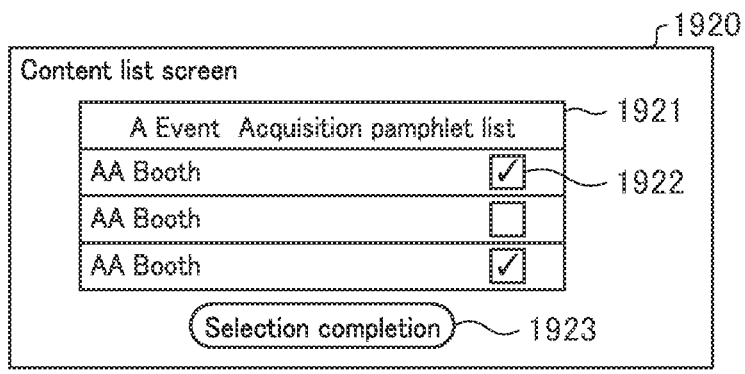

FIG. 19C is a diagram illustrating a display example presented to the user when the user operates the printing device 102 to select a content to be printed in S1805 of FIG. 18. A content list request screen 1920 is a diagram illustrating a GUI framework in the printing device 102. The display device 407 displays a list of contents requested by the user in an area 1921 of the content list request screen 1920.

The display device 407 displays a check box for selecting a content to be printed in an area 1922 of the content list request screen 1920. The user can request printing of the content by checking the check box displayed in the area 1922.

The display device 407 displays a selection completion button in an area 1923 of the content list request screen 1920. The user presses the selection completion button in the area 1923 when the selection of the content to be printed is completed. The display device 407 changes the display screen to a printing setting screen in FIG. 19D in response to the user's pressing of the selection completion button in the area 1923.

Figure 19D:
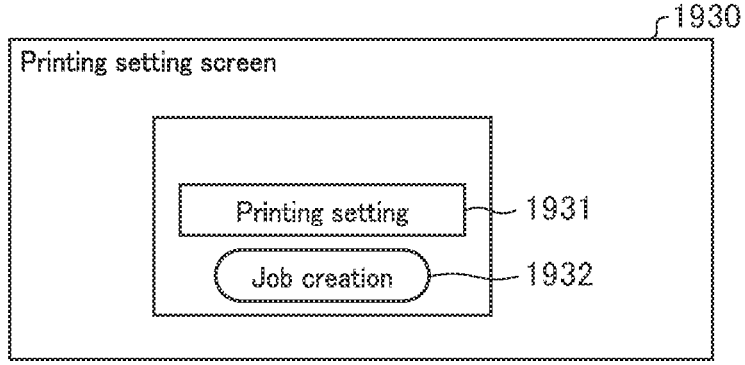

FIG. 19D is a diagram illustrating a display example presented to the user when the user operates the printing device 102 to select printing settings in S1806 of FIG. 18. A printing setting screen 1930 is a diagram illustrating a GUI framework in the printing device 102. The display device 407 displays a button for changing the display screen to a screen for setting details of printing settings in an area 1931 of the printing setting screen 1930. When the button in the area 1931 is pressed, the display device 407 displays the screen for setting details of printing settings which can be set in the printing device 102.

The display device 407 displays a job creation button in an area 1932 of the printing setting screen 1930. The user presses the job creation button in the area 1932 when the printing settings are completed. The printing device 102 transmits a content printing request to the Metaverse server 106 in response to the user's pressing of the job creation button in the area 1932.

As described above, the user presses the button in the area 1931 to edit the printing settings on the displayed screen and presses the job creation button in the area 1932, so that the job management server 105 can generate, issue, and print a printing job.

<Flowchart when Content Registration is Performed>

Figure 20:
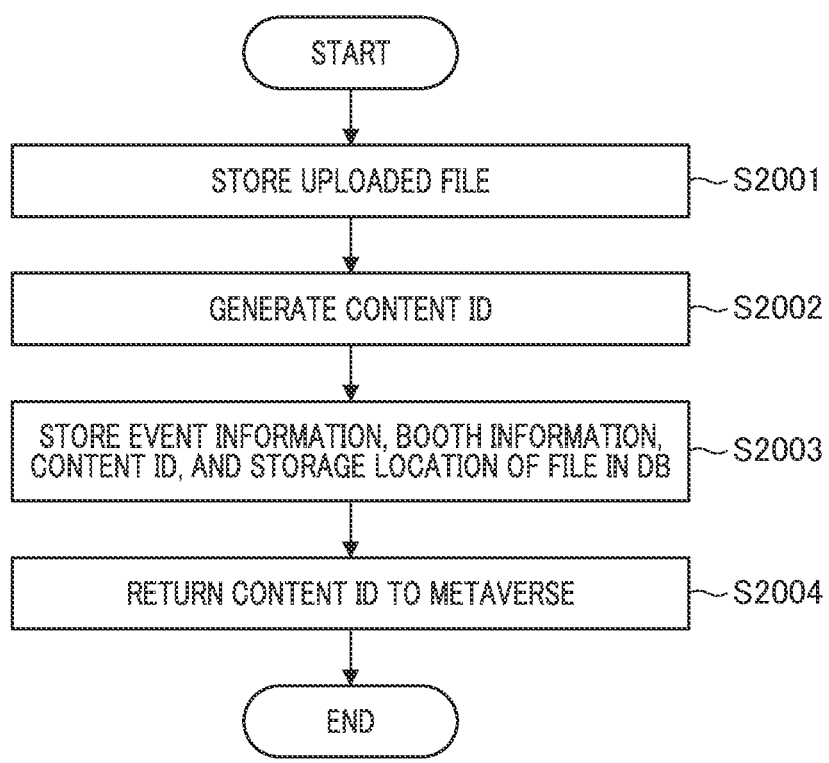
FIG. 20 is a flowchart showing content registration processing in the job management server 105 according to the first embodiment of the present disclosure.

FIG. 20 is a flowchart showing content registration processing in the job management server 105 according to the first embodiment of the present disclosure. The content registration processing in the job management server 105 corresponds to the processing from S1205 to S1208 in FIG. 12.

The content registration processing in the job management server 105 is started when the Metaverse server 106 uploads a file to the job management server 105 in S1204 of FIG. 12.

In S2001, the job management server 105 stores the file uploaded from the Metaverse server 106. This processing corresponds to the processing of S1205 in FIG. 12.

In the next S2002, the job management server 105 generates a content ID for the file stored in S2001. This processing corresponds to the processing of S1206 in FIG. 12.

In the next S2003, the job management server 105 stores event information, booth information, a content ID, and a storage location where a file is stored in the content information DB 904 as content information. This processing corresponds to the processing of S1207 in FIG. 12.

Next, in S2004, the job management server 105 returns the generated content ID to the Metaverse server 106. This processing corresponds to the processing of S1208 in FIG. 12. The Metaverse server 106 may transmit the content ID to the VR terminal 101. In this manner, the content registration processing in the job management server 105 is terminated.

<Flowchart when Request Content is Acquired>

Figure 21:
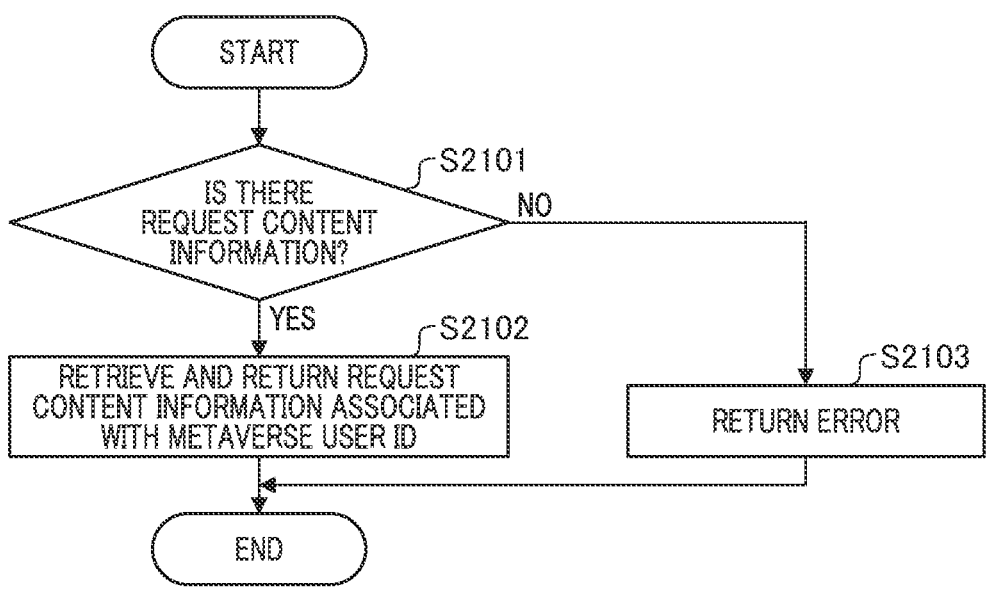
FIG. 21 is a flowchart showing requested content acquisition processing in the job management server 105 according to the first embodiment of the present disclosure.

FIG. 21 is a flowchart showing request content acquisition processing in the job management server 105 according to the first embodiment of the present disclosure. The request content acquisition processing in the job management server 105 corresponds to the processing from S1602 to S1603 in FIG. 16.

The request content acquisition processing in the job management server 105 is started when the job management server 105 receives a content list request from the Metaverse server 106 in S1601 of FIG. 16.

In S2101, the job management server 105 retrieves the request content information DB 905 using the Metaverse user ID included in the received content list request, and determines whether there is request content information associated with the Metaverse user ID. The job management server 105 executes processing of S2102 when there is request content information associated with the Metaverse user ID. The job management server 105 executes processing of S2103 when there is no request content information associated with the Metaverse user ID.

In S2102, the job management server 105 sets the request content information associated with the Metaverse user ID as a content list. This processing corresponds to the processing of S1602 in FIG. 16. In S2102, the job management server 105 returns the request content information to the Metaverse server 106 and terminates the processing. This processing corresponds to the processing of S1603 in FIG. 16.

In S2102, the job management server 105 transmits an error code to the Metaverse server 106 and terminates the processing.

<Flowchart when Content is Printed>

Figure 22:
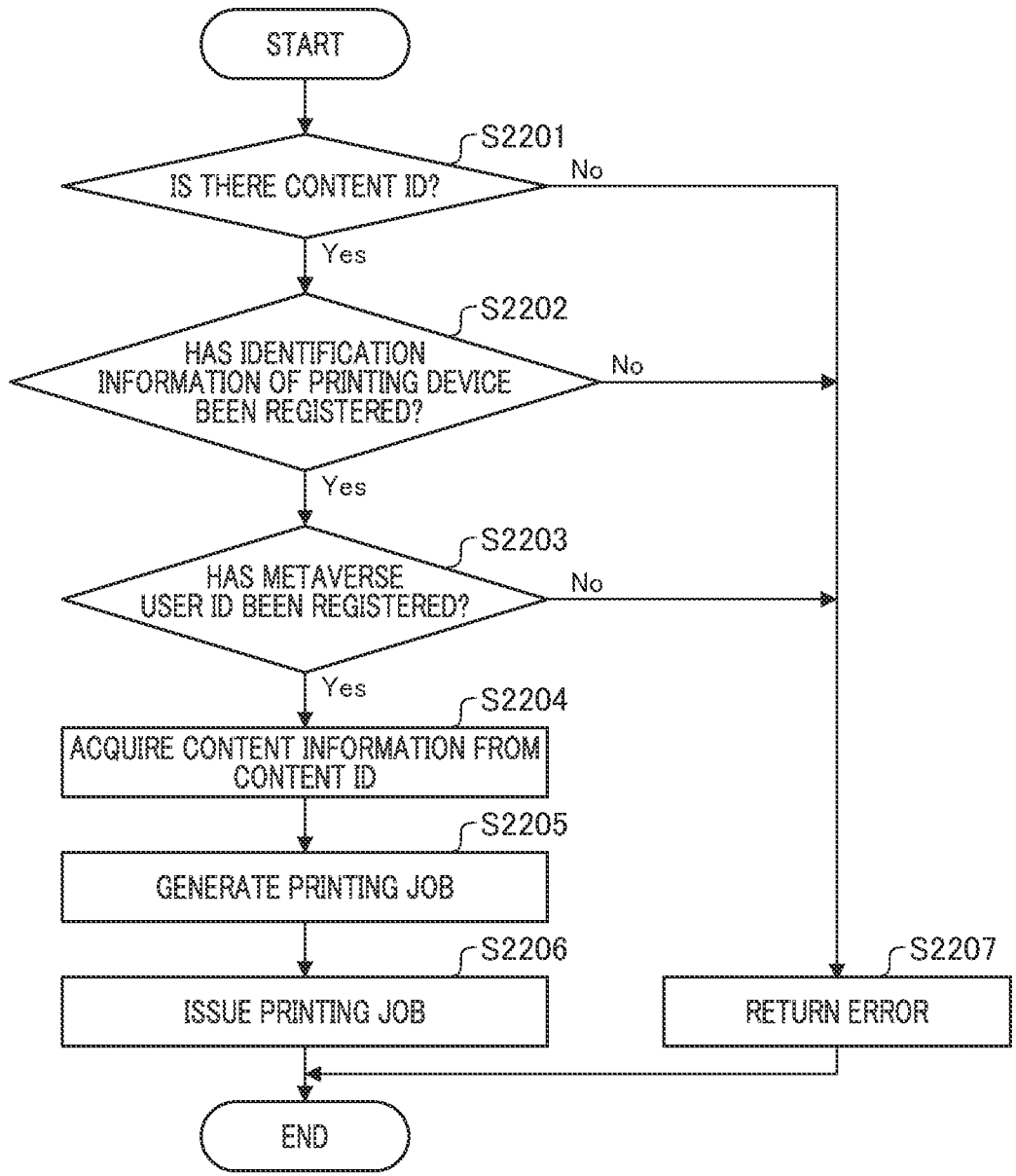
FIG. 22 is a flowchart showing content printing processing in the job management server 105 according to the first embodiment of the present disclosure.

FIG. 22 is a flowchart showing content printing processing in the job management server 105 according to the first embodiment of the present disclosure. The content printing processing in the job management server 105 corresponds to the processing from S1608 to S1610 in FIG. 16.

The content printing processing in the job management server 105 is started when the job management server 105 receives a content printing request from the Metaverse server 106 in S1607 of FIG. 16.

In S2201, the job management server 105 retrieves the content information DB 904 using the content ID included in the received content printing request, and determines whether the content ID has been registered in the content information DB 904. When the content ID has been registered in the content information DB 904, the job management server 105 executes processing of S2202. When the content ID has not been registered in the content information DB 904, the job management server 105 executes processing of S2207.

In S2202, the job management server 105 retrieves the printing device information DB 903 using the identification information of the printing device included in the received content printing request, and determines whether the identification information of the printing device has been registered in the printing device information DB 903. The job management server 105 executes processing of S2203 when the identification information of the printing device has been registered in the printing device information DB 903. When the identification information of the printing device has not been registered in the printing device information DB 903, the job management server 105 executes the processing of S2207.

In S2203, the job management server 105 retrieves the user information DB 902 using the Metaverse user ID included in the received content printing request, and determines whether the Metaverse user ID has been registered in the user information DB 902. When the Metaverse user ID has been registered in the user information DB 902, the job management server 105 executes processing of S2204. When the Metaverse user ID has not been registered in the user information DB 902, the job management server 105 executes the processing of S2207.

In S2204, the job management server 105 retrieves the content information DB 904 using the content ID included in the received content printing request, and acquires content information associated with the content ID.

In S2205, the job management server 105 generates a printing job for printing the content of the content information acquired in S2204 using the printing device and the printing settings selected in accordance with the information included in the received content printing request.

In S2206, the job management server 105 transmits a request for printing the printing job generated in S1609 to the printing device management server 104. Thereafter, the job management server 105 terminates the processing.

In S2207, the job management server 105 generates an error status code varying depending on the cause of an error so that it can be identified from which of S2201, S2202, and S2203 the transition has occurred. The job management server 105 transmits the generated error status code to the printing device 102. The printing device 102 that has received the error status code displays an error message corresponding to the received error status code. The job management server 105 may transmit the generated error status code to at least one of the VR terminal, the printing device 102, the Metaverse server 106, and the printing device management server 104.

<Data Structure of Content Information DB>

FIG. 23 is a diagram illustrating an example of a data structure of the content information DB 904 in the job management server 105 according to the first embodiment of the present disclosure. The content information DB 904 manages a file name of a content for each content ID. The content ID, the file name, and event-related information are stored in the content information DB 904 in association with each other. The file name and the event-related information are examples of detailed content information.

<Data Structure of Request Content Information DB>

FIG. 24 is a diagram illustrating an example of a data structure of the request content information DB 905 in the job management server 105 according to the first embodiment of the present disclosure. The request content information DB 905 manages request content information for each Metaverse user ID. The Metaverse user ID, a content ID, a file name of a content, and event-related information are stored in the request content information DB 905 in association with each other. The Metaverse user ID, the content ID, the file name, and the event-related information are examples of request content information.

Summary of First Embodiment

In the first embodiment described above, booth exhibitors upload a content to the job management server 105 and manage it in the content information DB 904. In this manner, according to the first embodiment, it is possible to reduce time and effort required for distributing a content.

In the first embodiment, when the user visits a booth, a request for acquiring a content is made and registered in the request content information DB 905, and contents can be collectively printed later. In this manner, according to the first embodiment, it is possible to eliminate time and effort for printing or downloading each time a content is acquired.

Furthermore, in the first embodiment, the user can confirm a request content list, confirm a content to be printed, and execute printing. In this manner, according to the first embodiment, it is possible to print only necessary contents through a simple procedure and to eliminate wastefulness.

In the first embodiment, an example in which the job management server 105 and the printing device management server 104 are separately provided has been described, but one server may have functions of the two servers.

The printing device management server 104, the job management server 105, and the Metaverse server 106 may be service servers provided by different business operators or may be service servers provided by one or more business operators.

Further, as one embodiment of the present disclosure, a printing system including the printing device management server 104 and the job management server 105 is configured, and this system may be provided by a business operator such as a vendor of the printing device 102. In this case, the printing device 102, the Metaverse server 106, and the like transmit requests and responses to several destinations (URLs, or the like) that are set in accordance with the purpose of the printing system without being aware of the internal configuration of the printing system. URL is an abbreviation for Uniform Resource Locator. When the business operator providing the Metaverse server 106 and the business operator providing the printing system are different from each other, it is assumed that a predetermined interface for mutual cooperation necessary for realizing the first embodiment is prepared in advance.

Second Embodiment

A second embodiment of the present disclosure is an example in which a printing time is set in advance before participating in an event, and selection and printing settings of a printing device 102 are performed. According to the second embodiment, data registered in a request content information DB 905 is acquired at a point in time when an event is terminated, and a user can acquire materials more smoothly after participating in the event. The second embodiment is described using the same reference numerals for the same configurations as those in the first embodiment.

<Time Printing Information Registration Processing>

The second embodiment has time printing information registration processing for registering time printing information. The time printing information is information for previously setting a time for printing a content.

Figure 25:
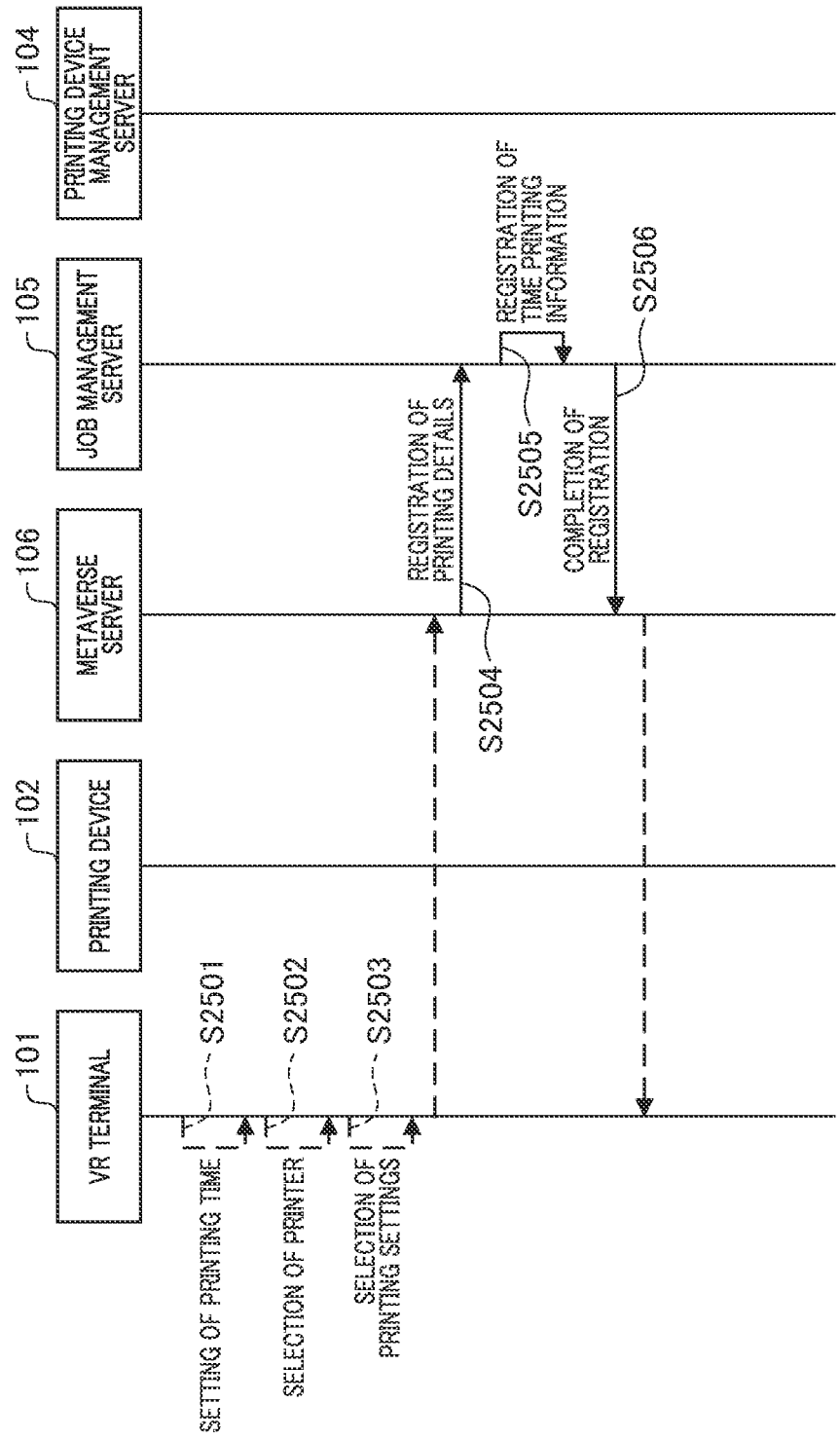
FIG. 25 is a sequence diagram illustrating time printing information registration processing in a system according to a second embodiment of the present disclosure.

FIG. 25 is a sequence diagram illustrating time printing information registration processing in the system according to the second embodiment of the present disclosure. The processing of FIG. 25 is processing executed between a VR terminal 101, a job management server 105, and a Metaverse server 106 illustrated in FIG. 1.

In S2501, the VR terminal 101 receives, for example, the time at which a content is desired to be printed on the Metaverse server 106 by the user's input, and a printing time is set based on the accepted time. In S2502, the VR terminal 101 displays a list of printable printers in response to the setting of the printing time in S2501, and receives the user's selection of a printer for printing.

In S2503, the VR terminal 101 displays a list of printing settings that can be performed by the selected printer in response to the reception of the selection of the printer for printing, and receives the user's selection of printing settings. The user operates the VR terminal 101 and requests time printing setting registration when the selection of the printing settings is completed. The VR terminal 101 transmits a printing detail registration request to the Metaverse server 106 in response to the selection of the printing settings and the reception of the request for time printing setting registration. In S2504, the Metaverse server 106 transmits the printing detail registration request to the job management server 105 in response to the reception of the printing detail registration request.

In S2505, the job management server 105 stores time printing information together with a Metaverse user ID of the requesting user in response to the reception of the printing detail registration request. The time printing information includes information on the printing time set in S2501, the selection of the printer for printing received in S2501, and information on the selection of printing settings received in S2503.

In S2506, the job management server 105 transmits a registration completion notification to the Metaverse server 106 in response to the storage of the time printing information.

<Display Example of VR Terminal in Time Printing Information Registration Processing>

Figure 26A:
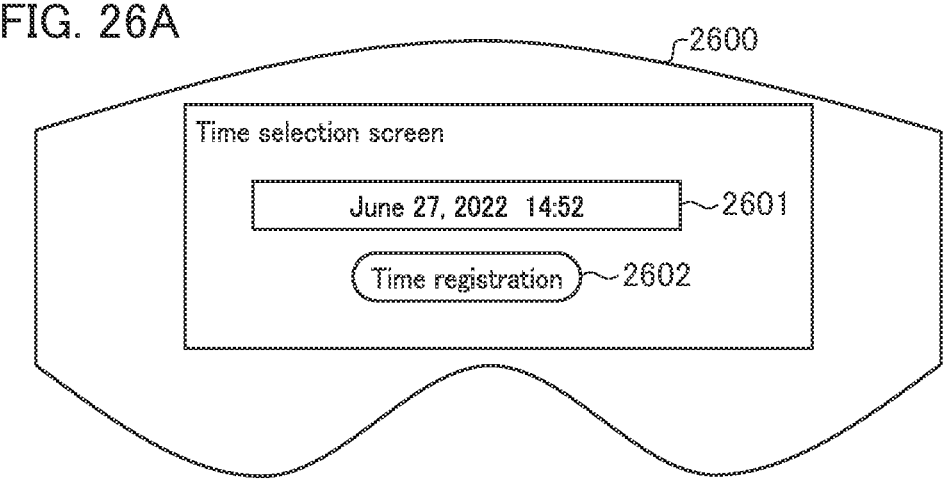
FIGS. 26A to 26C are diagrams illustrating a display example of a display unit 304 of a VR terminal 101 in the time printing information registration processing.
Figure 26B:
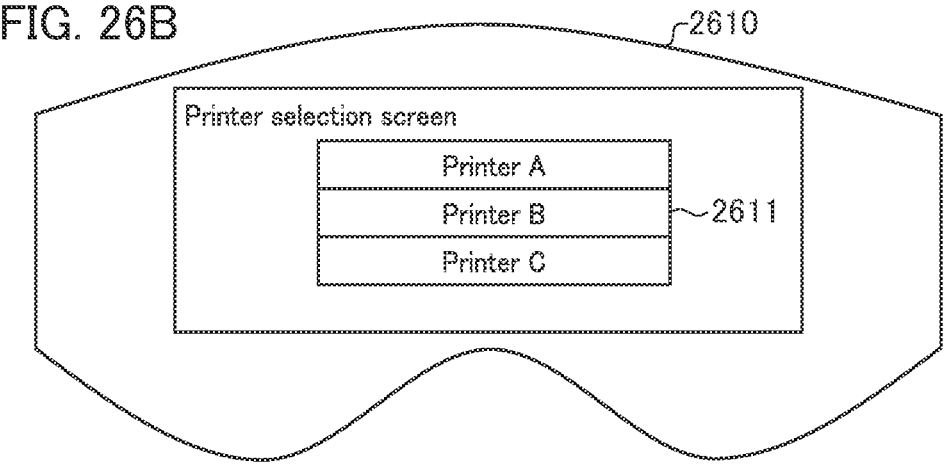
Figure 26C:
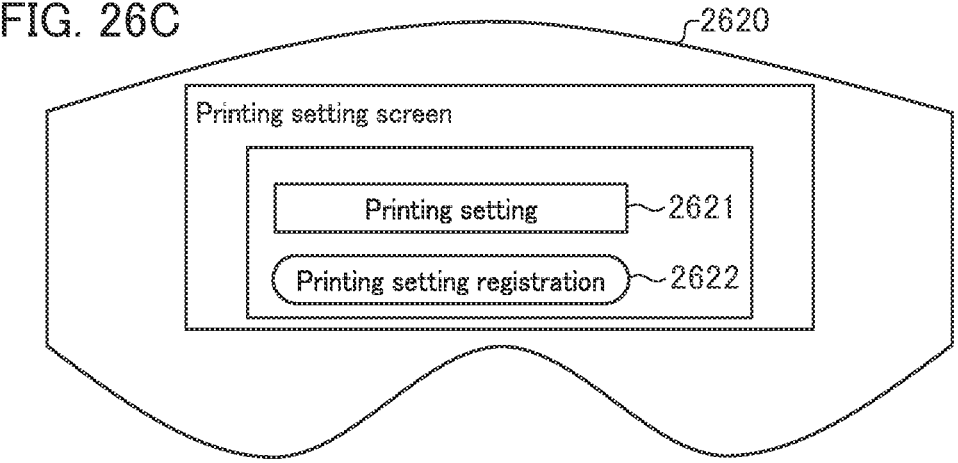

FIGS. 26A to 26C are diagrams illustrating a display example of the display unit 304 of the VR terminal 101 in time printing information registration processing.

FIG. 26A is a diagram illustrating a display example presented to the user when the user operates the VR terminal 101 to input the time at which the user desires to print a content in S2501 of FIG. 25. A time selection screen 2600 is a diagram illustrating a GUI framework in the VR terminal 101. The display unit 304 displays a desired printing time in an area 2601 of the time selection screen 2600. The user inputs a time in the area 2601.

The display unit 304 displays a button for requesting time printing setting registration in an area 2602 of the time selection screen 2600. The user can input the time input in the area 2601 as the time at which the content is desired to be printed by pressing the button displayed in the area 2602.

The display unit 304 changes the display screen to transition to a printer selection screen in FIG. 26B in response to the user's pressing of the button displayed in the area 2602.

FIG. 26B is a diagram illustrating a display example presented to the user when the user operates the VR terminal 101 to select a printer for printing in S2502 of FIG. 25. A printer selection screen 2610 is a diagram illustrating a GUI framework in the VR terminal 101. The display unit 304 displays a list of usable printers in an area 2611 of the printer selection screen 2610. The user selects a printer to be used for printing this time from among the printers displayed in the area 2611. The display unit 304 changes the display screen to a printing setting screen in FIG. 26C in response to the user's selection of the printer to be used for printing this time from among the printers displayed in the area 2611.

FIG. 26C is a diagram illustrating a display example presented to the user when the user operates the VR terminal 101 to select printing settings in S2503 of FIG. 25. A printing setting screen 2620 is a diagram illustrating a GUI framework in the VR terminal 101. The display unit 304 displays a button for changing the display screen to a screen for setting details of printing settings in an area 2621 of the printing setting screen 2620. When the button in the area 2621 is pressed, the display unit 304 displays a screen for setting details of printing settings that can be set by the printer set on the printer selection screen 2610.

The display unit 304 displays a printing setting registration button in an area 2622 of the printing setting screen 2620. The user presses the printing setting registration button in the area 2622 when the printing settings are completed. The VR terminal 101 transmits a printing detail registration request to the Metaverse server 106 in response to the user's pressing of the printing setting registration button in the area 2622.

<Content Acquisition Request Registration Processing>

Content acquisition request registration processing in the system according to the second embodiment is the same as the content acquisition request registration processing in the system according to the first embodiment illustrated in FIG. 14, and thus a description thereof is omitted.

<Time Printing Execution Processing>

FIG. 27 is a sequence diagram illustrating time printing execution processing in the system according to the second embodiment of the present disclosure. The processing in FIG. 27 is processing executed between the printing device 102, the printing device management server 104, and the job management server 105 illustrated in FIG. 1.

In S2701, the job management server 105 retrieves whether the time printing information registered in S2505 of FIG. 25 includes time printing information in which the target time is set as a printing time. As the target time, for example, the current time or several minutes after the current time can be used. When there is time printing information in which the target time is set as a printing time, the job management server 105 reads the time printing information in S2701, and the job management server 105 proceeds to the processing of S2702 to proceed with processing for the read time printing information.

In S2702, the job management server 105 acquires request content information based on a Metaverse user ID included in the read time printing information in response to the reading of the time printing information in which the target time is set as the printing time in S2701. In S2703, the job management server 105 acquires content information based on a content ID of the acquired request content information in response to the acquisition of the request content information in S2702.

In S2704, the job management server 105 generates a printing job from the acquired content information and time printing information in response to the acquisition of the content information in S2703. In S2705, the job management server 105 transmits a printing request including the generated printing job to the printing device management server 104 in response to the generation of the printing job in S2704.

In S2706, the printing device management server 104 transmits a printing command execution to the printing device 102 in response to the reception of the printing request from the job management server 105. In S2707, the printing device 102 prints a content in response to the reception of the printing command execution from the printing device management server 104.

According to this embodiment, as described above, a requested content can be printed by the printing device 102 at a registered time.

<Data Structure of Time Printing Information DB>

The time printing information stored in the job management server 105 may be managed in a database. A time printing information DB is a database that stores the time printing information.

FIG. 28 is a diagram illustrating an example of a data structure of the time printing information DB in the job management server 105 according to the second embodiment of the present disclosure. The time printing information DB manages a printing time for printing a content for each Metaverse user ID. The Metaverse user ID, a printing device ID, a printing time, and printing setting information are stored in the time printing information DB in association with each other. The Metaverse user ID, the printing device ID, the printing time, and the printing setting information are examples of time printing information.

OTHER EMBODIMENTS

Although some example embodiments of the present disclosure have been described above, some embodiments of the present disclosure are not limited to these embodiments, and various modifications and changes can be made within the scope of the gist thereof.

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-176741, which was filed on Nov. 2, 2022 and which is hereby incorporated by reference herein in its entirety.

What is claimed is:

1. A system comprising:
a printing system; and
a content management system,
wherein the content management system includes
a memory storing instructions, and
a processor executing the instructions causing the content management system to:
    manage content identification information of content data corresponding to a content provided through a virtual space,
    receive a user's instruction including user identification information of a user from a terminal for projecting an expression related to a predetermined space in the virtual space into the user's field of view, in a case where an operation to acquire the content provided through the virtual space is executed by the user in the predetermined space that the user has visited,
    manage the user identification information included in the user's instruction in association with the content identification information,
    receive a request using the user identification information,
    transmit the content data corresponding to the content identification information, which is managed in association with the user identification information included in the request, to a request source of the request, and
    transmit a printing request for the content data to the printing system, and
wherein the printing system includes a memory storing instructions, and a processor executing the instructions causing the printing system to control printing of the content data based on the printing request.

2. The system according to claim 1, wherein the request source of the request is the terminal or a printing device that prints the content data.

3. The system according to claim 1, wherein the user identification information is identification information based on both information regarding the user and information regarding the terminal.

4. The system according to claim 1, wherein the printing system includes a printing device management server that receives the printing request, and a printing device that prints the content data.

5. A method for controlling a system which includes a printing system and a content management system, the method comprising:
causing the content management system to
    manage content identification information of content data corresponding to a content provided through a virtual space, receive a user's instruction including user identification information of a user from a terminal for projecting an expression related to a predetermined space in the virtual space into the user's field of view, in a case where an operation to acquire the content provided through the virtual space is executed by the user in the predetermined space that the user has visited, manage the user identification information included in the user's instruction in association with the content identification information, receive a request using the user identification information, transmit the content data corresponding to the content identification information, which is managed in association with the user identification information included in the request, to a request source of the request, and transmit a printing request for the content data to the printing system; and causing the printing system to control printing of the content data based on the printing request.

\* \* \* \* \*